(12) United States Patent
Yoshioka et al.

(10) Patent No.: US 12,196,092 B2
(45) Date of Patent: Jan. 14, 2025

(54) METHOD OF EVALUATING PERFORMANCE OF GAS TURBINE AND DEVICE EXECUTING THIS METHOD

(71) Applicant: MITSUBISHI HEAVY INDUSTRIES, LTD., Tokyo (JP)

(72) Inventors: Shinichi Yoshioka, Tokyo (JP); Yasuhiro Niina, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/237,542

(22) Filed: Aug. 24, 2023

(65) Prior Publication Data

US 2024/0209751 A1 Jun. 27, 2024

(30) Foreign Application Priority Data

Aug. 31, 2022 (JP) ................. 2022-137855

(51) Int. Cl.
 *F01D 21/12* (2006.01)
 *F01D 9/04* (2006.01)
(52) U.S. Cl.
 CPC ............. *F01D 21/12* (2013.01); *F01D 9/041* (2013.01); *F05D 2240/35* (2013.01)
(58) Field of Classification Search
 CPC ............................ F01D 9/041; F05D 2240/35
 See application file for complete search history.

(56) References Cited

FOREIGN PATENT DOCUMENTS

JP 2008-217617 9/2008

OTHER PUBLICATIONS

Cesar Celis, "Steady State Detection in Industrial Gas Turbines for Condition Monitoring and Diagnostics Applications," GT2014-25007, Jun. 16-20, 2014. (Year: 2014).*
Craig R. Davison, "Determination of Steady State Gas Turbine Operation," GT2012-68632, Conference Paper • Jun. 2012 (Year: 2012).*
Donald L. Simon and Jonathan S. Litt, "A Data Filter for Identifying Steady-State Operating Points in Engine Flight Data for Condition Monitoring Applications," GT2010-22818, Jun. 14-18, 2010. (Year: 2010).*

* cited by examiner

*Primary Examiner* — David P. Olynick
(74) *Attorney, Agent, or Firm* — Wenderoth, Lind & Ponack, L.L.P.

(57) ABSTRACT

A method of evaluating performance of a gas turbine includes: acquiring static operation determination data and acquiring index value data; storing the acquired data; determining whether or not the gas turbine is in a static operation state in accordance with whether or not the static operation determination data for each of a plurality of times in a period in the past set in advance from a determination time among the static operation determination data for each of the plurality of times stored in the storing of the data entering a range of a variation width set in advance; and acquiring the evaluation index value using the index value data at the determination time at which the gas turbine is determined to be in the static operation state. The static operation determination data includes a cavity temperature between an inner shroud of a turbine vane and a rotor shaft.

17 Claims, 8 Drawing Sheets

METHOD OF EVALUATING PERFORMANCE OF GAS TURBINE AND DEVICE EXECUTING THIS METHOD

BACKGROUND OF THE INVENTION

1. Field of the Invention

The present disclosure relates to a method of evaluating the performance of a gas turbine and a device executing this method.

Priority is claimed on Japanese Patent Application No. 2022-137855, filed Aug. 31, 2022, the content of which is incorporated herein by reference.

2. Description of Related Art

A gas turbine includes a compressor that generates compressed air by compressing air, a combustor that generates a combustion gas by combusting a fuel in compressed air, and a turbine that is driven in accordance with a combustion gas.

The performance of such a gas turbine is evaluated using an evaluation index value such as a compressor efficiency or a turbine efficiency. Such an evaluation index value is acquired from index value data that is data from a measurement device measuring various state quantities and the like of a gas turbine. When a gas turbine is in a transient state, data from a plurality of measurement devices is not stable. For example, when an evaluation index value such as the turbine efficiency is acquired using data from a plurality of measurement devices when a gas turbine is in a transient state, an evaluation index value appropriate for a performance evaluation may not be able to be acquired.

Thus, Japanese Unexamined Patent Application, First Publication No. 2008-217617 discloses a technology in which it is determined whether or not process data from a plant such as a nuclear power plant is stationary, and the performance of the plant is evaluated on the basis of this process data or other process data of a time point at which this process data has been determined to be stationary.

SUMMARY OF THE INVENTION

An object of the present disclosure is to provide a technology capable of appropriately evaluating a performance of a gas turbine by acquiring an evaluation index value that is appropriate for a performance evaluation of the gas turbine.

A method of evaluating the performance of a gas turbine as one aspect for achieving the object described above is applied to the following gas turbine.

This gas turbine includes a compressor configured to be able to generate compressed air by compressing air, a combustor configured to be able to generate a combustion gas by combusting a fuel in the compressed air, and a turbine configured to be able to be driven using the combustion gas. The turbine described above includes a rotor configured to be able to rotate around an axis line as its center, a turbine casing covering an outer circumference of the rotor, a plurality of turbine vane rows disposed on an inner circumferential side of the turbine casing, and an exhaust duct through which an exhaust gas that is a combustion gas discharged from the turbine casing is able to circulate. The plurality of turbine vane rows are aligned with gaps interposed therebetween in an axis line direction in which the axis line extends. Each of the plurality of turbine vane rows described above includes a plurality of turbine vanes aligned in a circumferential direction with respect to the axis line.

The turbine vane described above includes a vane body, of which a cross-sectional shape perpendicular to a diameter direction with respect to the axis line forms a vane shape, extending in the diameter direction, an inner shroud disposed on a diameter direction inner side of the vane body, and an outer shroud disposed on a diameter direction outer side of the vane body. The rotor described above includes a rotor shaft extending in the axis line direction with the axis line as its center and a plurality of turbine blade rows attached to the rotor shaft. Each of the plurality of turbine blade rows described above is disposed on an axis line downstream side out of an axis line upstream side and the axis line downstream side in the axis line direction with respect to any one turbine vane row among the plurality of turbine vane rows. Each of the plurality of turbine blade rows described above includes a plurality of turbine blades aligned in the circumferential direction.

The method of evaluating the performance of the gas turbine includes: acquiring at least one piece of static operation determination data for determining whether or not the gas turbine is static operation state and acquiring index value data for acquiring an evaluation index value used for a performance evaluation of the gas turbine; storing the data acquired in the acquiring of static operation determination data and acquiring of index value data in a time series; determining whether or not the gas turbine is in a static operation state in accordance with a result of a data determining process by performing the data determining process of extracting the static operation determination data for each of a plurality of times in a period in the past set in advance from a determination time from among the static operation determination data for the plurality of times stored in the storing of the data and determining whether or not the extracted static operation determination data for each of the plurality of times enters a range of a variation width set in advance; and acquiring the evaluation index value using the index value data of the determination time at which the gas turbine is determined to be in the static operation state in the determining of whether or not the gas turbine is in the static operation state. At least one piece of the static operation determination data described above is an exhaust gas temperature difference that is a difference between a first exhaust gas temperature that is a temperature of an exhaust gas that has passed through a turbine blade row of a final stage that is a turbine blade row of the axis line furthest downstream side among the plurality of turbine blade rows and a second exhaust gas temperature that is the temperature of the exhaust gas at a position further away from the turbine blade row of the final stage than a position at which the first exhaust gas temperature is measured or a cavity temperature between the inner shroud of the turbine vane and the rotor shaft.

As a representative value of the evaluation index value of the gas turbine, there is turbine efficiency that is efficiency of the single turbine. This turbine efficiency can be acquired using a turbine entrance temperature and a second exhaust gas temperature. The turbine entrance temperature is a temperature of a combustion gas at the entrance of the turbine into which a combustion gas flows from the combustor.

When the turbine entrance temperature changes, and the flow rate of the combustion gas flowing into the cavity between the inner shroud of the turbine vane and the rotor shaft changes, the second exhaust gas temperature used when the turbine efficiency described above is acquired changes as well. For this reason, when a turbine efficiency is acquired using the turbine entrance temperature, the second exhaust gas temperature, and the like acquired in the process in which the flow rate of the combustion gas flowing into the cavity is changing, this turbine efficiency cannot be determined to be an appropriate turbine efficiency.

The second exhaust gas temperature is a temperature of an exhaust gas at a position further away from the turbine blade row of a final stage than a position at which the first exhaust gas temperature is measured. For this reason, a responsiveness of the change of the second exhaust gas temperature with respect to the change of the turbine entrance temperature is lower than a responsiveness of the change of the first exhaust gas temperature with respect to the change of the turbine entrance temperature. Thus, when the turbine entrance temperature changes, an exhaust gas temperature difference that is a difference between the first exhaust gas temperature and the second exhaust gas temperature also changes. For this reason, when a turbine efficiency is acquired using the turbine entrance temperature, the second exhaust gas temperature, and the like acquired in the process in which the exhaust gas temperature difference is changing, this turbine efficiency cannot be determined to be an appropriate turbine efficiency.

Thus, in this aspect, a cavity temperature or an exhaust gas temperature difference is acquired as one type of static operation determination data, and under the condition that this exhaust gas temperature difference is determined to be stationary, by using the evaluation value data of this determination time, a turbine efficiency that is one type of evaluation index value is acquired. Thus, in this embodiment, an evaluation index value that is appropriate for a performance evaluation can be acquired.

As one aspect for achieving the object described above, a performance evaluation program of a gas turbine is applied to the following gas turbine.

This gas turbine includes a compressor configured to be able to generate compressed air by compressing air, a combustor configured to be able to generate a combustion gas by combusting a fuel in the compressed air, and a turbine configured to be able to be driven using the combustion gas. The turbine described above includes a rotor configured to be able to rotate around an axis line as its center, a turbine casing covering an outer circumference of the rotor, a plurality of turbine vane rows disposed on an inner circumferential side of the turbine casing, and an exhaust duct through which an exhaust gas that is a combustion gas discharged from the turbine casing is able to circulate. The plurality of turbine vane rows are aligned with gaps interposed therebetween in an axis line direction in which the axis line extends. Each of the plurality of turbine vane rows described above includes a plurality of turbine vanes aligned in a circumferential direction with respect to the axis line. The turbine vane described above includes a vane body, of which a cross-sectional shape perpendicular to a diameter direction with respect to the axis line forms a vane shape, extending in the diameter direction, an inner shroud disposed on a diameter direction inner side of the vane body, and an outer shroud disposed on a diameter direction outer side of the vane body. The rotor described above includes a rotor shaft extending in the axis line direction with the axis line as its center and a plurality of turbine blade rows attached to the rotor shaft. Each of the plurality of turbine blade rows described above is disposed on an axis line downstream side out of an axis line upstream side and the axis line downstream side in the axis line direction with respect to any one turbine vane row among the plurality of turbine vane rows. Each of the plurality of turbine blade rows described above includes a plurality of turbine blades aligned in the circumferential direction.

This performance evaluation program of the gas turbine causes a computer to perform: acquiring at least one piece of static operation determination data for determining whether or not the gas turbine is static operation state and acquiring index value data for acquiring an evaluation index value used for a performance evaluation of the gas turbine; storing the data acquired in the acquiring of static operation determination data and acquiring of index value data in a time series; determining whether or not the gas turbine is in a static operation state in accordance with a result of a data determining process by performing the data determining process of extracting the static operation determination data for each of a plurality of times in a period in the past set in advance from a determination time from among the static operation determination data for the plurality of times stored in the storing of the data and determining whether or not the extracted static operation determination data for each of the plurality of times enters a range of a variation width set in advance; and acquiring the evaluation index value using the index value data of the determination time at which the gas turbine is determined to be in the static operation state in the determining of whether or not the gas turbine is in the static operation state. At least one piece of the static operation determination data described above is 1) an exhaust gas temperature difference that is a difference between a first exhaust gas temperature that is a temperature of an exhaust gas that has passed through a turbine blade row of a final stage that is a turbine blade row of the axis line furthest downstream side among the plurality of turbine blade rows and a second exhaust gas temperature that is the temperature of the exhaust gas at a position further away from the turbine blade row of the final stage than a position at which the first exhaust gas temperature is measured or 2) a cavity temperature between the inner shroud of the turbine vane and the rotor shaft.

By causing a computer to execute the performance evaluation program of this aspect, similar to the performance evaluating method according to one aspect described above, the computer acquires a cavity temperature or an exhaust gas temperature difference as one type of static operation determination data and, under the condition that this exhaust gas temperature difference is determined to be stationary, by using the evaluation value data of this determination time, acquires a turbine efficiency that is one type of evaluation index value. Thus, also in this aspect, an evaluation index value that is appropriate for a performance evaluation can be acquired.

A performance evaluating device for a gas turbine as one aspect for achieving the object described above is applied to the following gas turbine.

This gas turbine includes a compressor configured to be able to generate compressed air by compressing air, a combustor configured to be able to generate a combustion gas by combusting a fuel in the compressed air, and a turbine configured to be able to be driven using the combustion gas. The turbine described above includes a rotor configured to be able to rotate around an axis line as its center, a turbine casing covering an outer circumference of the rotor, a plurality of turbine vane rows disposed on an inner circumferential side of the turbine casing, and an exhaust duct through which an exhaust gas that is a combustion gas discharged from the turbine casing is able to circulate. The plurality of turbine vane rows are aligned with gaps interposed therebetween in an axis line direction in which the axis line extends. Each of the plurality of turbine vane rows described above includes a plurality of turbine vanes aligned in a circumferential direction with respect to the axis line. The turbine vane described above includes a vane body, of which a cross-sectional shape perpendicular to a diameter direction with respect to the axis line forms a vane shape, extending in the diameter direction, an inner shroud disposed on a diameter direction inner side of the vane body, and an outer shroud disposed on a diameter direction outer side of the vane body. The rotor described above includes a rotor shaft extending in the axis line direction with the axis line as its center and a plurality of turbine blade rows attached to the rotor shaft. Each of the plurality of turbine blade rows described above is disposed on an axis line downstream side out of an axis line upstream side and the axis line downstream side in the axis line direction with respect to any one turbine vane row among the plurality of turbine vane rows. Each of the plurality of turbine blade rows described above includes a plurality of turbine blades aligned in the circumferential direction.

This performance evaluating device for the gas turbine includes: a data acquiring unit configured to acquire at least one piece of static operation determination data for determining whether or not the gas turbine is static operation state and be able to acquire index value data for acquiring an evaluation index value used for a performance evaluation of the gas turbine; a data storing unit configured to store the data acquired by the data acquiring unit in a time series; a static operation determining unit configured to include a data determining unit extracting the static operation determination data for each of a plurality of times in a period in the past set in advance from a determination time from among the static operation determination data for the plurality of times stored in the storing of the data and determining whether or not the extracted static operation determination data for each of the plurality of times enters a range of a variation width set in advance and determine whether or not the gas turbine is in a static operation state in accordance with a determination result acquired by the data determining unit; and an evaluation index value calculating unit configured to acquire the evaluation index value using the index value data of the determination time at which the gas turbine is determined to be in the static operation state by the static operation determining unit. At least one piece of the static operation determination data described above is an exhaust gas temperature difference that is a difference between a first exhaust gas temperature that is a temperature of an exhaust gas that has passed through a turbine blade row of a final stage that is a turbine blade row of the axis line furthest downstream side among the plurality of turbine blade rows and a second exhaust gas temperature that is the temperature of the exhaust gas at a position further away from the turbine blade row of the final stage than a position at which the first exhaust gas temperature is measured or a cavity temperature between the inner shroud of the turbine vane and the rotor shaft.

In this aspect, similar to the performance evaluating method according to one aspect described above, a cavity temperature or an exhaust gas temperature difference is acquired as one type of static operation determination data, and under the condition that this exhaust gas temperature difference is determined to be stationary, by using the evaluation value data of this determination time, a turbine efficiency that is one type of evaluation index value is acquired. Thus, also in this aspect, an evaluation index value that is appropriate for a performance evaluation can be acquired.

According to one aspect of the present disclosure, an evaluation index value that is appropriate for a performance evaluation of a gas turbine is acquired, and performance of the gas turbine can be appropriately evaluated.

DETAILED DESCRIPTION OF THE INVENTION

Hereinafter, a method of evaluating performance of a gas turbine, a program for executing this method, and a performance evaluating device executing this method according to embodiments of the present invention will be described with reference to the drawings.

Gas Turbine Facility According to Embodiment

Before a method of evaluating performance of a gas turbine, a program for executing this method, and a performance evaluating device executing this method according to embodiments are described, a gas turbine facility including a gas turbine will be described.

Figure 1:
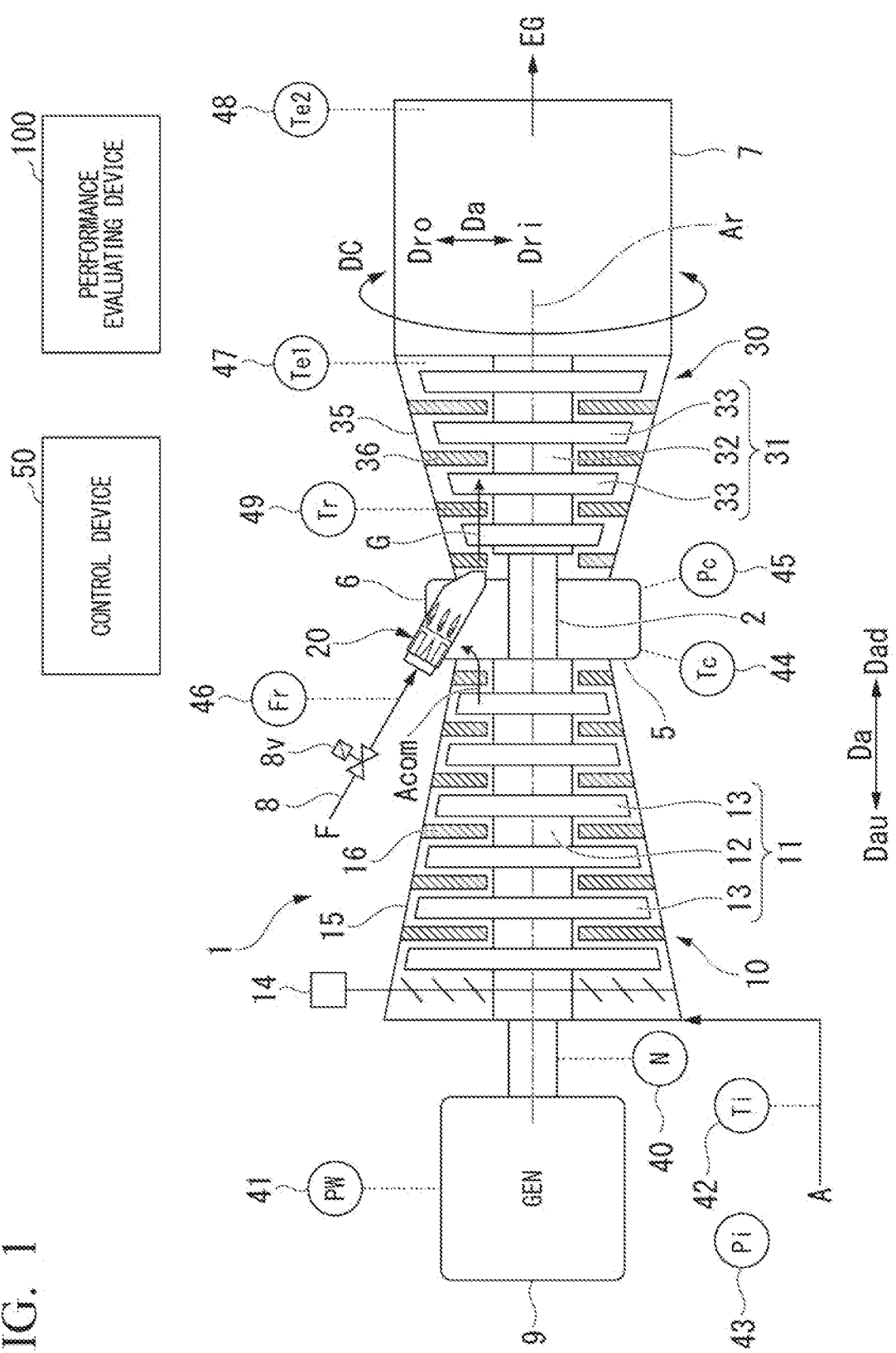
FIG. 1 is a schematic configuration diagram of a gas turbine facility according to an embodiment of the present disclosure.

A gas turbine facility according to this embodiment, as illustrated in FIG. 1, includes a gas turbine 1, a power generator 9 that generates electricity in accordance with driving of the gas turbine 1, a control device 50 controlling a control target in the gas turbine 1, and a performance evaluating device 100 evaluating performance of the gas turbine 1.

The gas turbine 1 includes a compressor 10 that generates compressed air Acom by compressing air A, a plurality of combustors 20 that generate a combustion gas G by combusting a fuel F from a fuel supply source in the compressed air Acom, a turbine 30 that is driven by the combustion gas G, and a plurality of measurement devices.

The compressor 10 includes a compressor rotor 11 that rotates around an axis line Ar at its center, a compressor casing 15 that covers the compressor rotor 11, a plurality of turbine vane rows 16, and an inlet guide vane (IGV) 14 that is disposed in a suction port of this compressor casing 15. This IGV 14 adjusts a flow rate of air suck into the inside of the compressor casing 15. The turbine 30 includes a turbine rotor 31 that rotates around an axis line Ar as its center, a turbine casing 35 that covers the turbine rotor 31, and a plurality of turbine vane rows 36. Hereinafter, a direction in which the axis line Ar extends will be referred to as an axis line direction Da, a circumferential direction having this axis line Ar as its center will be simply referred to as a circumferential direction Dc, and a direction perpendicular to the axis line Ar will be referred to as a diameter direction Dr. In addition, one side of the axis line direction Da will be referred to as an axis line upstream side Dau, and a side opposite thereto will be referred to as an axis line downstream side Dad. Furthermore, a side approaching the axis line Ar in the diameter direction Dr will be referred to as a diameter direction inner side Dri, and a side opposite thereto will be referred to as a diameter direction outer side Dro.

The compressor 10 is disposed on the axis line upstream side Dau with respect to the turbine 30.

The compressor rotor 11 and the turbine rotor 31 are positioned on the same axis line Ar and are connected to each other to form a gas turbine rotor 2. A rotor of the power generator 9 is connected to this gas turbine rotor 2. In addition, the gas turbine 1 includes a middle casing 6 and an exhaust duct 7. This middle casing 6 is disposed between the compressor casing 15 and the turbine casing 35 in the axis line direction Da. The exhaust duct 7 is connected to an edge of the axis line downstream side Dad of the turbine casing 35. The compressor casing 15, the middle casing 6, the turbine casing 35, and the exhaust duct 7 are connected to each other and form a gas turbine casing 5.

The compressor rotor 11 has a rotor shaft 12 extending from the axis line Ar as its center in the axis line direction Da and a plurality of turbine blade rows 13 attached to this rotor shaft 12. The plurality of turbine blade rows 13 are aligned in the axis line direction Da. Each of the turbine blade rows 13 is composed of a plurality of turbine blades aligned in a circumferential direction Dc. On the axis line downstream side Dad of each of the plurality of turbine blade rows 13, one turbine vane row 16 of the plurality of turbine vane rows 16 is disposed. Each turbine vane row 16 is disposed on the inner side of the compressor casing 15. Each turbine vane row 16 is composed of a plurality of turbine vanes aligned in the circumferential direction Dc.

The turbine rotor 31 has a rotor shaft 32 extending from the axis line Ar as its center in the axis line direction Da and a plurality of turbine blade rows 33 attached to this rotor shaft 32. The plurality of turbine blade rows 33 are aligned in the axis line direction Da. Each of the turbine blade rows 33 is composed of a plurality of turbine blades aligned in the circumferential direction Dc. On the axis line upstream side Dau of each of the plurality of turbine blade rows 33, one turbine vane row 36 of the plurality of turbine vane rows 36 is disposed. Each turbine vane rows 36 is disposed on the inner side of the turbine casing 35. Each of the turbine vane rows 36 is composed of a plurality of turbine vanes aligned in the circumferential direction Dc.

A ring-shaped space between an outer circumferential side of the rotor shaft 32 and an inner circumferential side of the turbine casing 35 in which the turbine blade row 33 and the turbine vane row 36 are disposed in the axis line direction Da forms a combustion gas flow passage 39 through which a combustion gas G from the combustor 20 flows.

Figure 2:
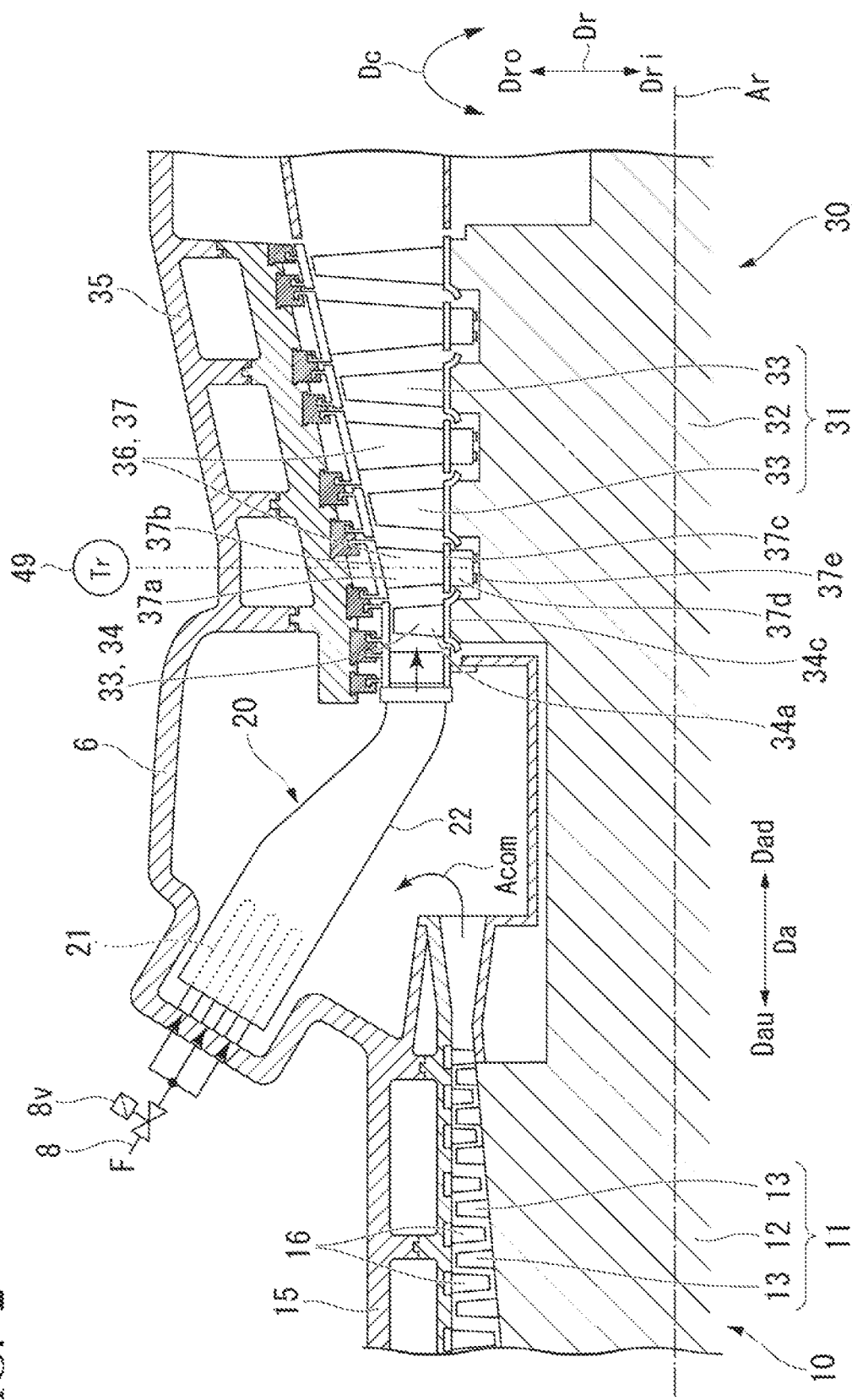
FIG. 2 is a main part cross-sectional view of a gas turbine according to an embodiment of the present disclosure.

As illustrated in FIG. 2, each of all the plurality of turbine blades 34 configuring the turbine blade row 33 of the turbine includes a blade body 34a and a platform 34c, and the blade body 34a has a cross-section of a blade shape and extends in the diameter direction Dr that is perpendicular to this cross-section. The platform 34c is disposed at an end of the blade body 34a on a diameter direction inner side Dri. This platform 34c defines a part of an edge of the diameter direction inner side Dri of the combustion gas flow passage 39. Each of all the plurality of turbine vanes 37 composing the turbine vane row 36 of the turbine 30 includes a vane body 37a, an outer shroud 37b, an inner shroud 37c, a seal retaining part 37d, and a seal 37e. The vane body 37a has a cross-section of a vane shape and extends in the diameter direction Dr that is perpendicular to this cross-section. The outer shroud 37b is disposed at an end of a diameter direction outer side Dro of the blade body 34a. This outer shroud 37b defines a part of an edge of the diameter direction outer side Dro of the combustion gas flow passage 39. This outer shroud 37b is attached to the turbine casing 35. The inner shroud 37c is disposed at an end of the diameter direction inner side Dri of the vane body 37a. This inner shroud 37c defines a part of an edge of the diameter direction inner side Dri of the combustion gas flow passage 39. The seal retaining part 37d is disposed on the diameter direction inner side Dri of the inner shroud 37c. The seal 37e is disposed on the diameter direction inner side Dri of the seal retaining part 37d. This seal 37e seals a space between the outer circumferential face of the turbine rotor 31 and the edge of the diameter direction inner side Dri of the turbine vane 37.

A plurality of combustors 20 are aligned in parallel with the circumferential direction Dc and are attached to the middle casing 6. The combustor 20 includes a transition piece (or a combustor liner) 22 in which a fuel F is combusted inside and a burner 21 that injects a fuel F to the inside of this transition piece 22. A fuel line 8 is connected to the burner 21. A fuel valve 8v that adjusts a flow rate of a fuel F supplied to the combustor 20 is disposed in this fuel line 8.

As illustrated in FIG. 1, the gas turbine 1 includes, as a plurality of measurement devices, a rotation number counter 40, an output meter 41, an intake air temperature indicator 42, an intake air pressure gauge 43, a discharge air temperature indicator 44, a discharge pressure gauge 45, a fuel flow rate meter 46, a first exhaust gas temperature indicator 47, a second exhaust gas temperature indicator 48, and a cavity temperature indicator 49. The rotation number counter 40 measures a rotation number N of the gas turbine rotor 2. The output meter 41 measures an output PW of the power generator 9 as a gas turbine output. The intake air temperature indicator 42 measures an intake air temperature Ti that is a temperature of air A taken in by the compressor 10. The intake air pressure gauge 43 measures an intake air pressure (atmosphere) Pi that is a pressure of air A taken in by the compressor 10. The discharge air temperature indicator 44 measures a discharge air temperature Tc that is a temperature of compressed air discharged into the inside of the middle casing 6 from the compressor 10. The discharge pressure gauge 45 measures a discharge pressure Pc that is a pressure of compressed air discharged to the inside of the middle casing 6 from the compressor 10. The fuel flow rate meter 46 measures a fuel flow rate Fr flowing into the combustor 20. This fuel flow rate meter 46 is disposed in the fuel line 8. The first exhaust gas temperature indicator 47 measures a first exhaust gas temperature Te1 that is a temperature of an exhaust gas EG that is a combustion gas G immediately after passing through a turbine blade row of a final stage of the turbine 30.

The second exhaust gas temperature indicator 48 measures a second exhaust gas temperature Te2 that is a temperature of an exhaust gas EG that has flown into the exhaust duct 7 from the turbine 30. In addition, the second exhaust gas temperature Te2 is a temperature of an exhaust gas EG at a position further away from the turbine blade row of a final stage than a position at which the first exhaust gas temperature Te1 is measured. In other words, the second exhaust gas temperature Te2 is a temperature of an exhaust gas at the position of the axis line downstream side Dad of the position at which the first exhaust gas temperature Te1 is measured. The cavity temperature indicator 49, as illustrated in FIG. 2, measures a cavity temperature Tr that is a temperature between the inner shroud 37c of the turbine vane 37 and the rotor shaft 32.

The control device 50 controls a degree of opening of the fuel valve 8v, a drive amount of the IGV 14, and the like in accordance with data from a plurality of measurement devices described above, a request output from the outside, and the like.

The gas turbine 1 operates as below in accordance with control of this control device 50.

As illustrated in FIG. 1, the compressor 10 generates compressed air Acom by compressing air A and discharges this compressed air Acom to the inside of the middle casing 6. The compressed air Acom inside the middle casing 6 flows into the inside of the combustor 20. A fuel F is supplied to the combustor 20. The burner 21 of the combustor 20 injects the compressed air Acom into the inside of the transition piece 22 together with the fuel F. Inside the transition piece 22, a fuel F is combusted in the compressed air Acom, and a combustion gas G of a high temperature and high pressure is generated. This combustion gas G is sent from the transition piece 22 to the combustion gas flow passage 39 inside the turbine 30. The combustion gas G rotates the turbine rotor 31 in the process of flowing through the combustion gas flow passage 39 to the axis line downstream side Dad. In accordance with rotation of this turbine rotor 31, a rotor of the power generator 9 connected to the gas turbine rotor 2 rotates. As a result, the power generator 9 generates electric power. An exhaust gas EG that is a combustion gas G that has passed through the turbine blade row of the final stage of the turbine 30 flows into the inside of the exhaust duct 7. For example, after flowing through the inside of an exhaust heat recovery boiler, this exhaust gas EG is discharged from a chimney.

The performance evaluating device 100 acquires an evaluation index value used for evaluating the performance of the gas turbine 1 on the basis of data from a plurality of the measurement devices described above.

Method of evaluating performance of gas turbine, program for executing this method, and performance evaluating device executing this method according to embodiment Hereinafter, a method of evaluating performance of a gas turbine, a program for executing this method, and a performance evaluating device executing this method according to embodiments described above will be described mainly with reference to FIGS. 3 to 7.

Figure 3:
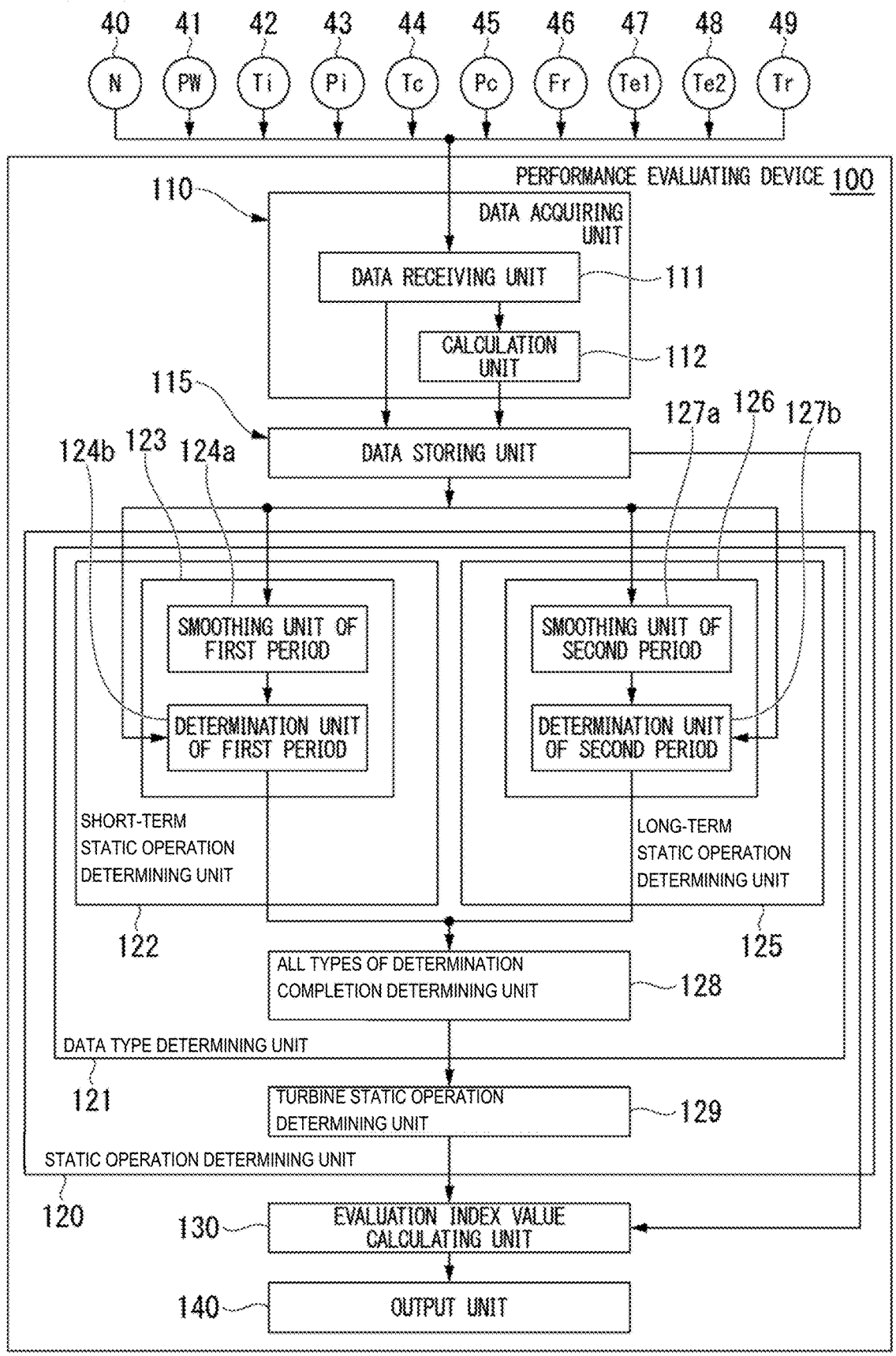
FIG. 3 is a functional block diagram of a performance evaluating device according to an embodiment of the present disclosure.

Functionally, as illustrated in FIG. 3, the performance evaluating device 100 includes a data acquiring unit 110, a data storing unit 115, a static operation determining unit 120, an evaluation index value calculating unit 130, and an output unit 140.

The data acquiring unit 110 acquires static operation determination data for determining whether or not the gas turbine 1 is static operation state and index value data for acquiring an evaluation index value used for evaluating the performance of the gas turbine 1.

As the static operation determination data, there are an output PW of the power generator 9 as a gas turbine output measured by the output meter 41, an intake air temperature Ti measured by the intake air temperature indicator 42, an exhaust gas temperature difference Td (=(Te1−Te2)) that is a difference between a first exhaust gas temperature Te1 measured by the first exhaust gas temperature indicator 47 and a second exhaust gas temperature Te2 measured by the second exhaust gas temperature indicator 48, and a cavity temperature Tr measured by the cavity temperature indicator 49.

As the index value data, there are a rotation number N of the gas turbine rotor measured by the rotation number counter, an output PW of the power generator 9 as a gas turbine output measured by the output meter 41, a intake air temperature Ti measured by the intake air temperature indicator 42, an intake air pressure Pi measured by the intake air pressure gauge 43, a discharge air temperature Tc measured by the discharge air temperature indicator 44, a discharge pressure Pc measured by the discharge pressure gauge 45, a fuel flow rate Fr measured by the fuel flow rate meter 46, and a second exhaust gas temperature Te2Te2 measured by the second exhaust gas temperature indicator 48.

This data acquiring unit 110 includes a data receiving unit 111 that receives data from a plurality of measurement devices and a calculation unit 112. The calculation unit 112 acquires an average value of temperatures measured by a plurality of first exhaust gas temperature indicators 47 and sets this average value as the first exhaust gas temperature Te1. In addition, this calculation unit 112 acquires an exhaust gas temperature difference Td that is a difference between the first exhaust gas temperature Te1 and the second exhaust gas temperature Te2 from the second exhaust gas temperature indicator 48.

The data storing unit 115 stores a plurality of types of static operation determination data and a plurality of types of use value data acquired by the data acquiring unit 110 in a time series.

The static operation determining unit 120 determines whether or not the gas turbine 1 is in a static operation state on the basis of time series data for each of the plurality of types of static operation determination data stored in the data storing unit 115.

This static operation determining unit 120 includes a data type determining unit 121 that determines whether or not each of a plurality of types of static operation determination data is stationary and a turbine static operation determining unit 129 that determines whether or not the gas turbine 1 is in a static operation state.

The data type determining unit 121 includes a short-term static operation determining unit 122 and a long-term static operation determining unit 125 that perform determination for each of a plurality of types of static operation determination data.

The short-term static operation determining unit 122 includes a data determining unit 123 that extracts static operation determination data for each of a plurality of times in a first period T1 in the past set from a determination time tj in advance from static operation determination data for a plurality of times stored by the data storing unit 115 and determines whether or not the extracted static operation determination data for each of the plurality of times enters a range of a variation width set in advance for static operation determination data. This data determining unit 123 includes a smoothing unit 124a and a determination unit 124b. The smoothing unit 124a smooths static operation determination data for each of a plurality of times during the first period T1. The determination unit 124b determines whether or not an absolute value |MA1−Xtj| of a difference between the static operation determination data MA1 smoothed by the smoothing unit 124a and static operation determination data Xtj at a determination time tj is less than a value ε1 set in advance. In a case in which this absolute value |MA1−Xtj| is less than the value ε1 set in advance, the determination unit 124b determines that the static operation determination data for each of a plurality of times during the first period T1 enters the range of the variation width for this static operation determination data. In other words, in this case, it is determined that this static operation determination data is stationary in the first period T1.

The long-term static operation determining unit 125 includes a data determining unit 126 that extracts static operation determination data for each of a plurality of times in a second period T2 in the past set from a determination time in advance from static operation determination data for a plurality of times stored by the data storing unit 115 and determines whether or not the extracted static operation determination data for each of the plurality of times enters a range of a variation width set in advance for static operation determination data. This second period T2 is a period longer than the first period T1. This data determining unit 126 includes a smoothing unit 127a and a determination unit 127b. The smoothing unit 127a smooths static operation determination data for each of a plurality of times during the second period T2. The determination unit 127b determines whether or not an absolute value |MA2−Xtj| of a difference between the static operation determination data MA2 smoothed by the smoothing unit 127a and static operation determination data Xtj at a determination time tj is less than a value ε2 set in advance. In a case in which this absolute value |MA2-Xtj| is less than the value ε2 set in advance, the determination unit 127b determines that the static operation determination data for each of a plurality of times during the second period T2 enters the range of the variation width for this static operation determination data. In other words, in this case, it is determined that this static operation determination data is stationary in the second period T2.

The data type determining unit 121 further includes a determination completion determining unit 128 that determines whether or not the determination performed by the short-term static operation determining unit 122 and the determination performed by the long-term static operation determining unit 125 have been completed for all the types of static operation determination data.

The turbine static operation determining unit 129 determines that the gas turbine 1 is in the static operation state under the condition that all the plurality of types of static operation determination data are determined to be stationary in the first period T1 and the second period T2.

The evaluation index value calculating unit 130 acquires an evaluation index value using index value data at the time of determination at which the gas turbine 1 has been determined to be in the static operation state by the static operation determining unit 120. Examples of the evaluation index value include compressor efficiency, a turbine output, a turbine entrance temperature, turbine efficiency, and the like.

The turbine entrance temperature is a temperature of a combustion gas at the entrance of the turbine 30 into which a combustion gas flows from the combustor 20.

The output unit 140 outputs the evaluation index value acquired by the evaluation index value calculating unit 130 in accordance with an instruction from the outside.

Figure 4:
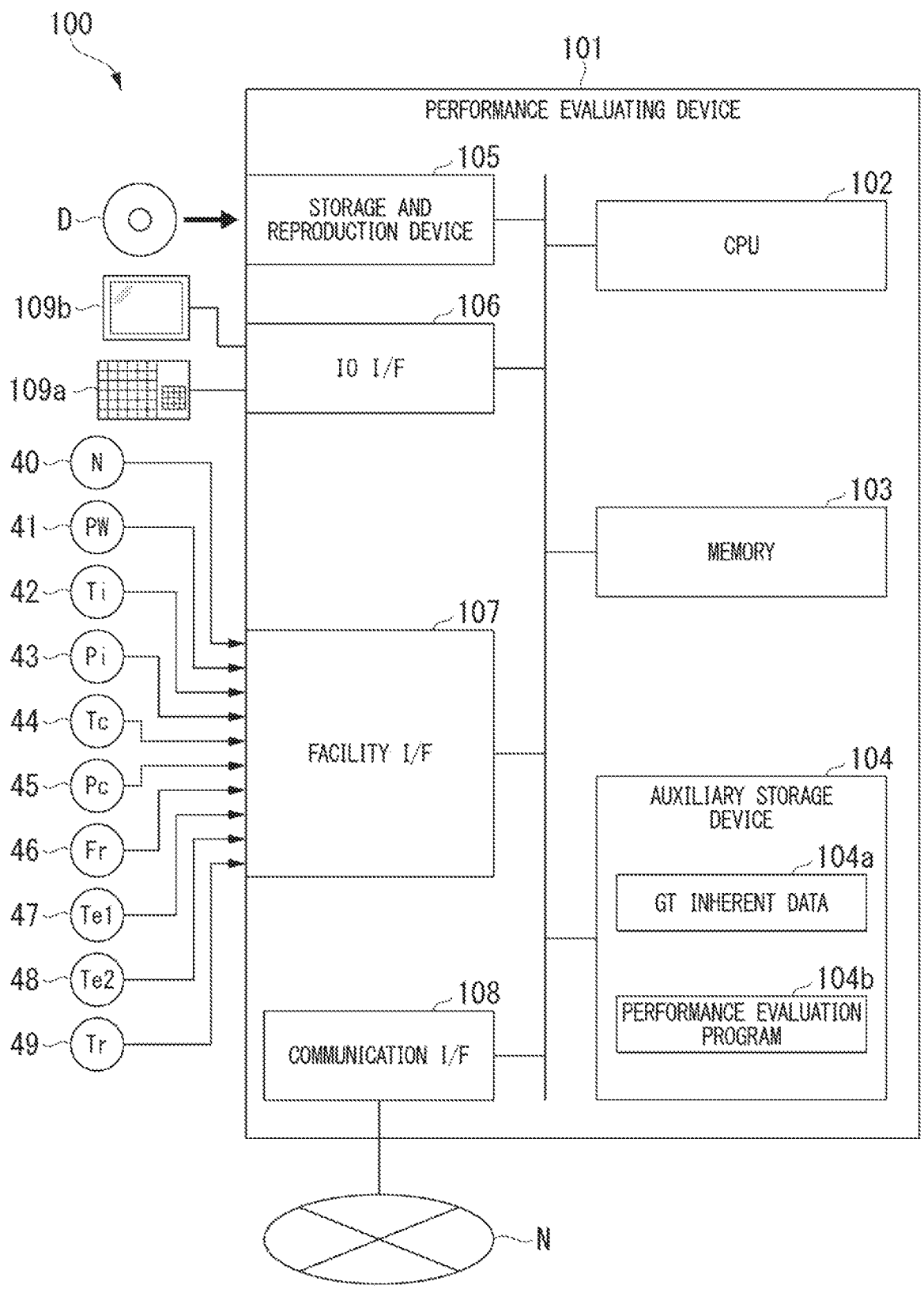
FIG. 4 is an explanatory diagram illustrating a hardware configuration of a performance evaluating device according to an embodiment of the present disclosure.

The performance evaluating device 100 described above is a computer. For this reason, in terms of hardware, as illustrated in FIG. 4, this performance evaluating device 100 includes a computer main body 101, input devices 109a such as a keyboard, a mouse, and the like, and a display device 109b. The computer main body 101 includes a central processing unit (CPU) 102 performing various arithmetic operations, a main storage device 103 such as a memory serving as a work area of the CPU 102, an auxiliary storage device 104 such as a hard disk drive device, a storage and reproduction device 105 that performs a data storing process and a data reproducing process for a disk-type storage medium D, an input/output interface 106 of the input device 109a and the display device 109b, a facility interface 107 that is connected to a plurality of measurement devices through signal lines, and a communication interface 108 used for communicating with the outside through a network N.

The plurality of measurement devices are connected to the control device 50 through signal lines. For this reason, the facility interface 107 of the performance evaluating device 100 may receive data acquired from the plurality of measurement devices from the control device 50.

In the auxiliary storage device 104, inherent data 104a of the gas turbine 1, a performance evaluating program 104b, and the like are stored in advance. The inherent data 104a, the performance evaluating program 104b, and the like, for example, are received in the auxiliary storage device 104 from the disk-type storage medium D through the storage and reproduction device 105. In addition, the inherent data 104a, the performance evaluating program 104b, and the like may be received in the auxiliary storage device 104 from an external device through the communication interface 108.

Among the functional elements of the performance evaluating device 100 described with reference to FIG. 3, the data receiving unit 111 of the data acquiring unit 110 is configured to include a facility interface 107 and a CPU 102 executing the performance evaluating program 104b. In addition, the calculation unit 112 of the data acquiring unit 110, the static operation determining unit 120, and the evaluation index value calculating unit 130 are configured to include a CPU 102 executing the performance evaluating program 104b and a main storage device 103 that is a work area of this CPU 102. The data storing unit 115 is configured to include a CPU 102 executing the performance evaluating program 104b, a main storage device 103 that is a work area of this CPU 102, and an auxiliary storage device 104. The output unit 140 is configured to include a CPU 102 that executes the performance evaluating program 104b, a main storage device 103 that is a work area of this CPU 102, a display device 109b, and an input/output interface 106.

Figure 5:
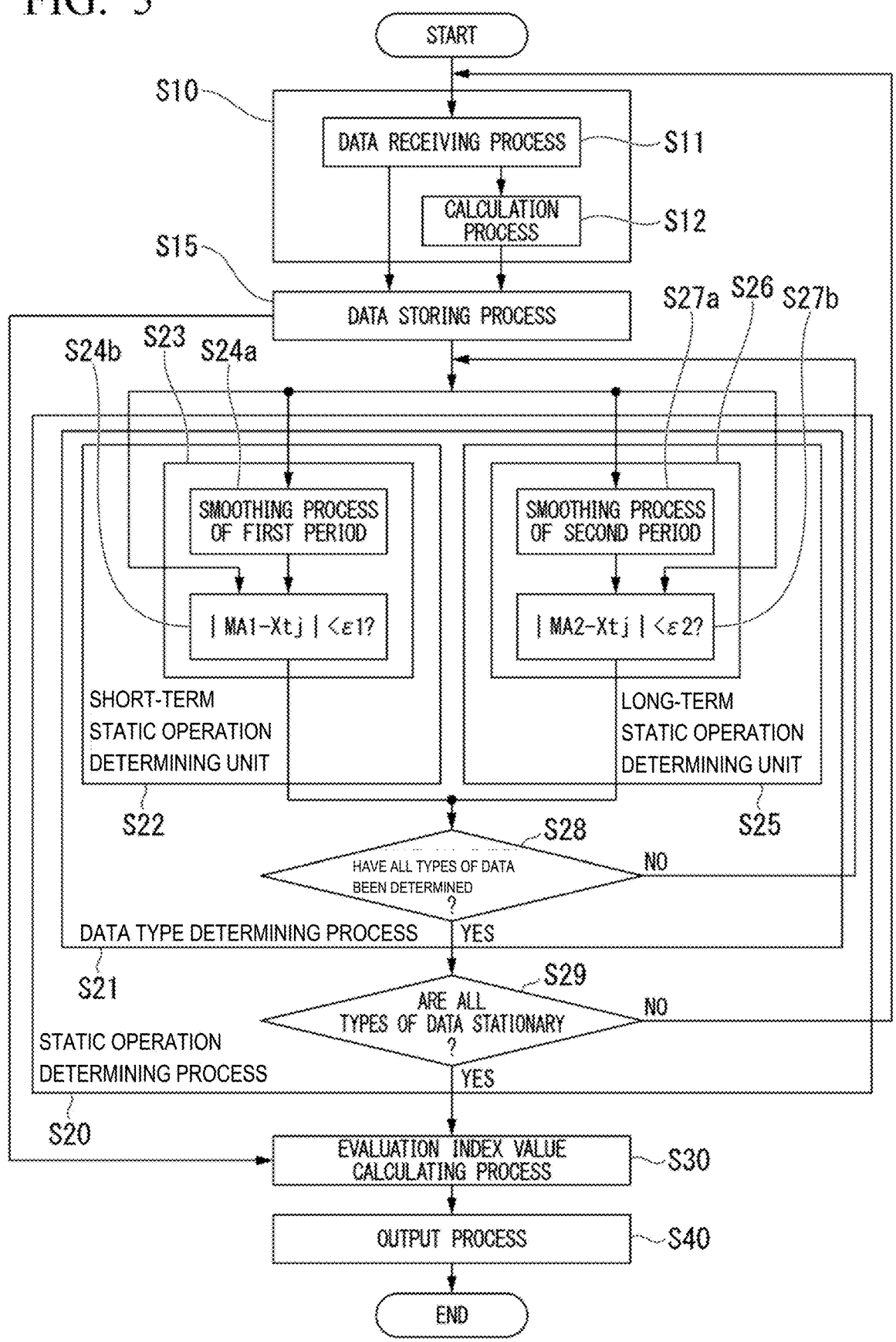
FIG. 5 is a flowchart illustrating operations of a performance evaluating device according to an embodiment of the present disclosure.

Next, operations of the performance evaluating device 100 described above will be described using a flowchart illustrated in FIG. 5.

First, the data acquiring unit 110 acquires a plurality of types of static operation determination data and a plurality of types of index value data (data acquiring process S10). This data acquiring process S10 includes a data receiving process S11 and a calculation process S12. In the data receiving process S11, the data receiving unit 111 receives data from a plurality of measurement devices. In the calculation process S12, the calculation unit 112 acquires an average value of temperatures measured by a plurality of first exhaust gas temperature indicators 47 out of data received in the data receiving process S11 and sets this average value as a first exhaust gas temperature Te1. In addition, this calculation unit 112 acquires an exhaust gas temperature difference Td that is a difference between the first exhaust gas temperature Te1 and a second exhaust gas temperature Te2 from the second exhaust gas temperature indicator 48. As described above, this exhaust gas temperature difference Td is one piece of static operation determination data.

The data storing unit 115 stores a plurality of types of static operation determination data and a plurality of types of index value data acquired by the data acquiring unit 110 in a time series (data storing process S15).

The static operation determining unit 120 determines whether or not the gas turbine 1 is in a static operation state on the basis of time series data for each of the plurality of types of static operation determination data stored in the data storing unit 115 (static operation determining process S20).

In this static operation determining process S20, the data type determining unit 121 determines whether or not each of a plurality of types of static operation determination data is stationary (data type determining process S21). In addition, in this static operation determining process S20, the turbine static operation determining unit 129 determines whether or not the gas turbine 1 is in a static operation state (turbine static operation determining process S29).

In the data type determining process S21, for each of a plurality of types of static operation determination data, together with the short-term static operation determining unit 122 performing a short-term static operation determining process S22, the long-term static operation determining unit 125 performs a long-term static operation determining process S25.

In the short-term static operation determining process S22, the data determining unit 123 of the short-term static operation determining unit 122 extracts static operation determination data for each of a plurality of times in a first period T1 in the past set from a determination time tj in advance from static operation determination data for a plurality of times stored by the data storing unit 115 and determines whether or not the extracted static operation determination data for each of the plurality of times enters a range of a variation width set in advance for static operation determination data (data determining process S23 and S26). Here, for example, the first period T1 is a period of about 10 minutes to 30 minutes.

In the data determining process S23 in the short-term static operation determining process S22, the smoothing unit 124*a* of the short-term static operation determining unit 122 smooths static operation determination data for each of a plurality of times during the first period T1 (smoothing process S24*a*). In addition, in the data determining process S23, the determination unit 124*b* of the short-term static operation determining unit 122 determines whether or not an absolute value |MA1−Xtj| of a difference between the static operation determination data MA1 smoothed by the smoothing unit 124*a* and static operation determination data Xtj at a determination time tj is less than a value ε1 set in advance (determination process S24*b*). In a case in which this absolute value |MA1−Xtj| is less than the value ε1 set in advance, the determination unit 124*b* determines that the static operation determination data for each of a plurality of times during the first period T1 enters the range of the variation width for this static operation determination data. In other words, in this case, it is determined that this static operation determination data is stationary in the first period T1.

In the smoothing process S24*a*, as methods for smoothing static operation determination data for each of a plurality of times, there are a method of taking a simple moving average of static operation determination data of a plurality of times, a method of taking a weighted moving average of static operation determination data of a plurality of times, a method of taking an exponential moving average of static operation determination data of a plurality of times, and the like. The smoothing unit 124*a* acquires an average value of static operation determination data of a plurality of times using any one of the methods described above and sets this average value as data acquired by smoothing the static operation determination data of the plurality of times.

Here, a simple moving average and an exponential moving average will be described. It is assumed that the number of samples during a period is n. In addition, as illustrated in FIG. 6, it is assumed that a state quantity x as data is 0 at time t0 to time t50, and a state quantity X as data is 100 after time t51.

A simple moving average (SMAtj) at a determination time (tj) is acquired using the following Equation.

$$SMAtj = \{Xtj + X(tj-1) + X(tj-2) \ldots + X(tj-(n-2)) + X(tj-(n-1))\}/n$$

Figure 6:
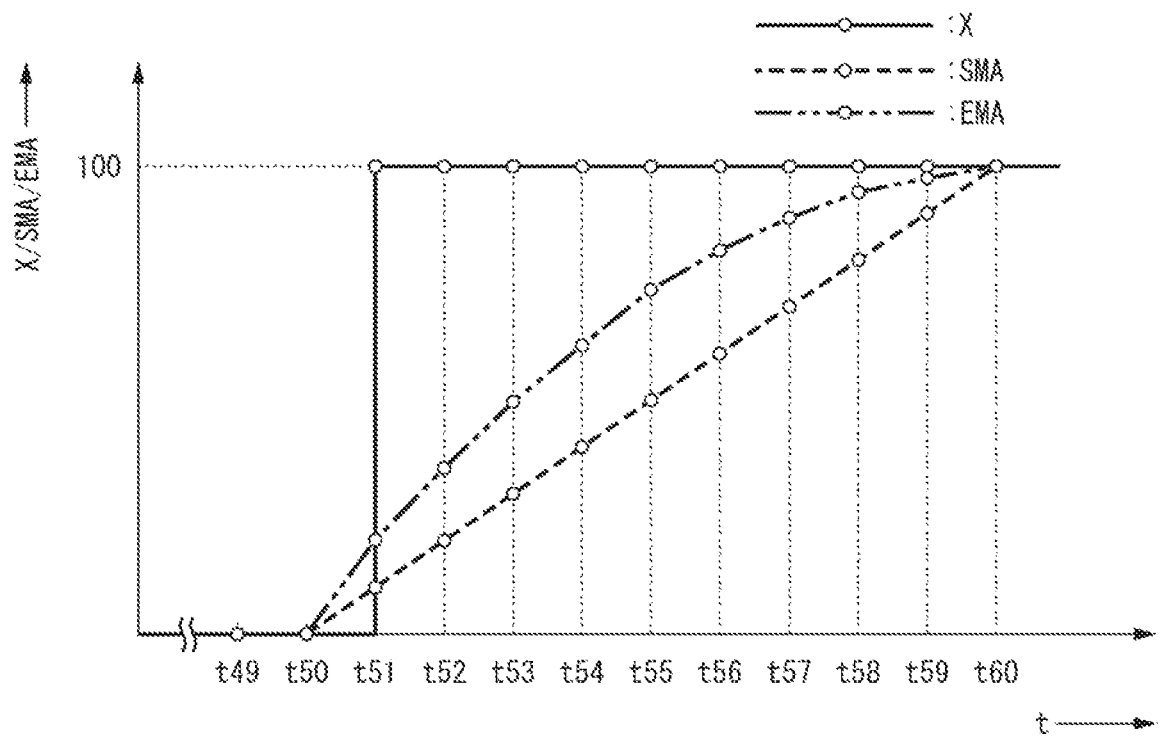
FIG. 6 is a graph showing a change of a state quantity, a change of a simple moving average, and a change of an exponential moving average according to elapse of time.

For this reason, as illustrated in FIG. 6, when the state quantity X becomes 100 from 0, the value of the simple moving average SMA linearly increases in accordance with elapse of time after time t51.

An exponential moving average (EMAtj) at a determination time (tj) is acquired using the following equation.

$$EMAtj = EMA(tj-1) \times (1-\alpha) + Xtj \times \alpha$$
$$= EMA(tj-1) + \alpha \times (Xtj - EMA(tj-1))$$

Here, a constant α is a value less than 1 that changes in accordance with the number of samples.

Thus, for example, an exponential moving average (EMAt52) at the determination time (tj) being t52 can be represented as below.

$$EMAt52 = EMA(t51) + \alpha \times (X(t52) - EMA(t51))$$

In addition, an exponential moving average (EMAt53) at the determination time (tj) being t53 can be represented as below.

$$EMAt53 = EMA(t52) + \alpha \times (X(t53) - EMA(t52))$$

As illustrated above, among ratios of state quantities for a plurality of samples for a value of the exponential moving average EMA, as a state quantity of a sample becomes closer to the determination time, the ratio thereof becomes exponentially higher.

For this reason, as illustrated in FIG. 6, when time t51 at which the state quantity X suddenly becomes 100 from 0 is set as the determination time tj, the value of the exponential moving average EMAtj at this determination time tj is larger than the value of the simple moving average SMAtj at the same determination time tj. Thereafter, as the time t of the determination time tj advances, a difference of the value of the exponential moving average EMA from the value of the simple moving average SMA at the corresponding determination time tj gradually decreases.

Figure 7:
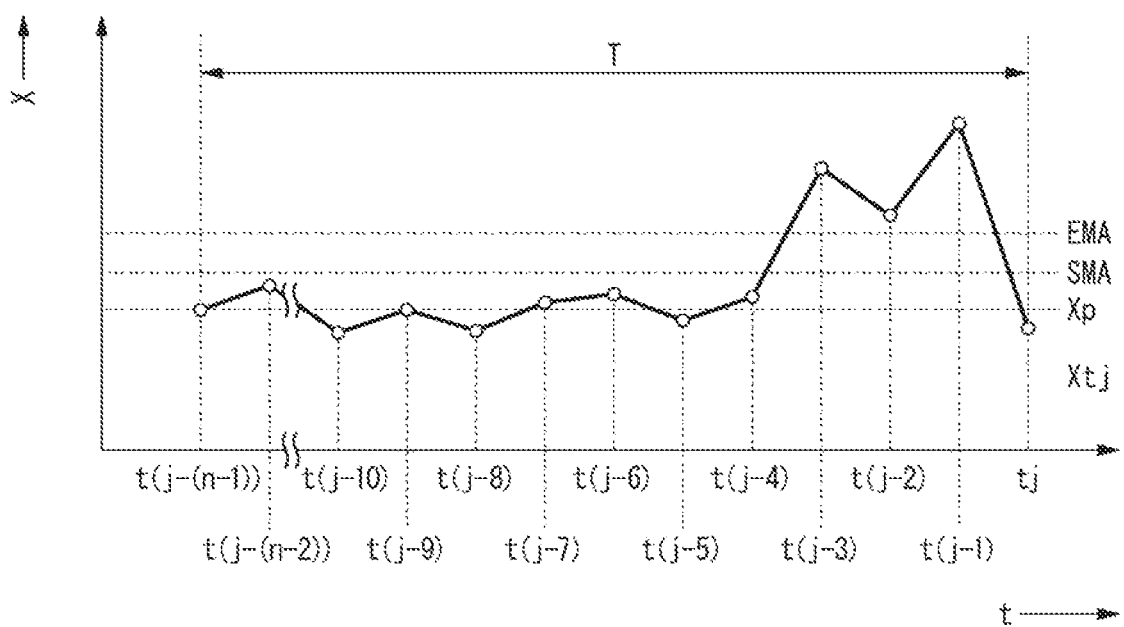
FIG. 7 is a graph showing an example of a change of a state quantity according to elapse of time.

As illustrated in FIG. 7, it is assumed that, among a plurality of state quantities X during a period T, a state quantity Xtj at the determination time tj has an approximately predetermined value Xp, some of state quantities at times t(j−1), t(j−2), and t(j−3) close to this determination time tj have values greatly different from the predetermined value Xp, and all the state quantities at the other times t(j−4), t(j−5), . . . , t(j−(n−1)) have almost predetermined values Xp. In this case, the value of the exponential moving average EMA relating to the state quantity X of each time during the period T is larger than the value of the simple moving average SMA relating to state quantities X of each time during the period T. For this reason, even in a case in which static operation determination data is determined to be stationary during a period when the value of a simple moving average SMA of the static operation determination data for a plurality of times during a period T is used as data acquired by smoothing the static operation determination data for the plurality of times during the period T, there are cases in which the static operation determination data is determined not to be stationary during a period T when the value of an exponential moving average EMA of the static operation determination data for a plurality of times during the period is used as data acquired by smoothing the static operation determination data for the plurality of times during the period T.

For this reason, it is preferable that the smoothing unit 124a use the value of an exponential moving average EMA of static operation determination data for a plurality of times during a period T as data acquired by smoothing the static operation determination data for the plurality of times during the period T.

In the long-term static operation determining process S25, the data determining unit 126 of the long-term static operation determining unit 125 extracts static operation determination data for each of a plurality of times in a second period T2 in the past set from a determination time tj in advance from static operation determination data for a plurality of times stored by the data storing unit 115 and determines whether or not the extracted static operation determination data for each of the plurality of times enters a range of a variation width set in advance for static operation determination data (data determining process S26). Here, for example, the second period T2 is a period of about 60 minutes to 120 minutes.

In the data determining process S26 in the long-term static operation determining process S25, the smoothing unit 127a of the long-term static operation determining unit 125 smooths static operation determination data for each of a plurality of times during the second period T2 (smoothing process S27a). In addition, in the data determining process S26, the determination unit 127b of the long-term static operation determining unit 125 determines whether or not an absolute value |MA2−Xtj| of a difference between the static operation determination data MA2 smoothed by the smoothing unit 127a and static operation determination data Xtj at a determination time tj is less than a value ε2 set in advance (determination process S27b). In a case in which this absolute value |MA2−Xtj| is less than the value &2 set in advance, the determination unit 127b determines that the static operation determination data for each of a plurality of times during the second period T2 enters the range of the variation width for this static operation determination data. In other words, in this case, it is determined that this static operation determination data is stationary in the second period T2.

In addition, similar to the smoothing unit 124a of the short-term static operation determining unit 122, it is preferable that the smoothing unit 127a of the long-term static operation determining unit 125 use the value of an exponential moving average EMA of static operation determination data for a plurality of times during the period T as data acquired by smoothing the static operation determination data for the plurality of times during the period T.

When the determination of the short-term static operation determining process S22 and the determination of the long-term static operation determining process S25 ends, the determination completion determining unit 128 determines whether or not the determination of the short-term static operation determining process S22 and the determination of the long-term static operation determining process S25 have been completed for all types of static operation determination data (determination completion determining process S28). In a case in which it is determined that the determination of the short-term static operation determining process S22 and the determination of the long-term static operation determining process S25 have not been completed for all types of static operation determination data in this determination completion determining process S28, the process returns to the short-term static operation determining process S22 and the long-term static operation determining process S25. In the short-term static operation determining process S22, static operation determination data for which the determination of the short-term static operation determining process S22 has not been performed is extracted from among a plurality of types of static operation determination data stored by the data storing unit 115, and determination is performed for this static operation determination data. In addition, also in the long-term static operation determining process S25, static operation determination data for which the determination of the long-term static operation determining process S25 has not been performed is extracted from among a plurality of types of static operation determination data stored by the data storing unit 115, and determination is performed for this static operation determination data. In a case in which it is determined that the determination of the short-term static operation determining process S22 and the determination of the long-term static operation determining process S25 have been completed for all types of static operation determination data in this determination completion determining process S28, the data type determining process S21 ends.

In the determination completion determining process S28 in the data type determining process S21, in a case in which it is determined that the determination of the short-term static operation determining process S22 and the determination of the long-term static operation determining process S25 have been completed for all types of static operation determination data, the turbine static operation determining unit 129 determines whether or not all types of static operation determination data are stationary (turbine static operation determining process S29). Here, in a case in which, for all the types of static operation determination data, stationary is determined in the short-term static operation determining process S22, and stationary is determined in the long-term static operation determining process S25, it is determined that all types of static operation determination data are stationary. When the turbine static operation determining unit 129 determines that all the types of static operation determination data is not stationary, the process returns to the data acquiring process S10, and, in this data acquiring process S10, a plurality of types of static operation determination data and a plurality of types of index value data at a new time are acquired. On the other hand, when the turbine static operation determining unit 129 determines that all the types of static operation determination data is stationary, the gas turbine 1 is regarded to be in the static operation state.

As above, the static operation determining process S20 ends.

When the gas turbine 1 is determined to be in the static operation state in the static operation determining process S20, the evaluation index value calculating unit 130 extracts a plurality of types of index value data at the determination time tj at which the gas turbine 1 has been determined to be in the static operation state from the data storing unit 115 and acquires an evaluation index value using the plurality of types of index value data (evaluation index value calculating process S30). As described above, examples of the evaluation index value include compressor efficiency, a turbine output, a turbine entrance temperature, turbine efficiency, and the like.

The compressor efficiency ηc at a determination time tj is acquired using the following equation using an intake air temperature Ti measured by the intake air temperature indicator 42 at the determination time tj, a discharge air temperature Tc measured by the discharge air temperature indicator 44 at the determination time tj, and an ideal discharge air temperature Tcr at the determination time tj.

$$\eta c = (Tc - Ti)/(Tcr - Ti)$$

The ideal discharge air temperature Tcr at the determination time tj is a temperature at a time when air having an intake air temperature Ti at the determination time tj is adiabatically compressed up to a pressure ratio of the compressor 10 at the determination time tj.

A pressure ratio of the compressor 10 at the determination time tj is a ratio (Pc/Pi) between an intake air pressure Pi measured by the intake air pressure gauge 43 at the determination time tj and a discharge pressure Pc measured by the discharge pressure gauge 45 at the determination time tj. Thus, the compressor efficiency ne can be acquired using the intake air temperature Ti, the intake air pressure Pi, the discharge air temperature Tc, and the discharge pressure Pc.

When a turbine output PWt that is an output PW of a single turbine 30 is to be acquired, first, a compressor driving force PWc at the determination time tj is acquired. The compressor driving force PWc at the determination time tj is acquired using the following equation using the intake air temperature Ti at the determination time tj, the discharge air temperature Tc at the determination time tj, an intake air flow rate Q at the determination time tj, and a specific heat ca of the air.

$$PWc = Q \times ca \times (Tc - Ti)$$

The intake air flow rate Q at the determination time tj is acquired as below. A relation between the intake air flow rate Q and the intake air temperature Ti and the intake air pressure Pi is set in advance in each compressor 10.

Thus, by using this relation, an intake air flow rate Q corresponding to an intake air temperature Ti measured by the intake air temperature indicator 42 at the determination time tj and an intake air pressure Pi measured by the intake air pressure gauge 43 at the determination time tj is acquired.

A turbine output PWt can be acquired using the following equation using the compressor driving force PWc at the determination time tj and the power generator output PW that is an output of the entire gas turbine 1 measured by the output meter 41 at the determination time tj described above.

$$PWt = PW + PWc$$

A turbine entrance temperature Ttin at the determination time tj can be acquired using the following equation using an intake air flow rate Q at the determination time tj, a fuel flow rate Fr measured by the fuel flow rate meter 46 at the determination time tj, a second exhaust gas temperature Te2 measured by the second exhaust gas temperature indicator 48 at the determination time tj, and a specific heat cg of a combustion gas, and a turbine output PWt at the determination time.

$$PWt = (Q + Fr) \times cg \times (Ttin - T2)$$

In addition, as described above, the intake air flow rate Q is acquired from the intake air temperature Ti and the intake air pressure Pi.

Furthermore, the turbine output PWt is acquired from the power generator output PW, the intake air temperature Ti, and the discharge air temperature Tc. For this reason, the turbine entrance temperature Ttin at the determination time tj can be acquired using the intake air temperature Ti at the determination time tj, the intake air pressure Pi at the determination time tj, the discharge air temperature Tc at the determination time tj, the fuel flow rate Fr measured by the fuel flow rate meter 46 at the determination time tj, and the second exhaust gas temperature Te2 measured by the second exhaust gas temperature indicator 48 at the determination time tj. In addition, in a case in which a part of the air compressed by the compressor 10 is used for cooling turbine blades and turbine vanes that are in contact with a combustion gas of a high temperature among the components configuring the turbine 30, when the turbine entrance temperature Ttin is to be acquired, the temperature and the flow rate of this air are also taken into account.

The turbine efficiency ηt at a determination time can be acquired using the following equation using the turbine entrance temperature Ttin at the determination time tj, the second exhaust gas temperature Te2 measured by the second exhaust gas temperature indicator 48 at the determination time tj, and the ideal exhaust gas temperature Te2r at the determination time tj.

$$\eta t = (Ttin - T2)/(Ttin - Te2r)$$

Here, the ideal exhaust gas temperature Te2r at the determination time tj is a temperature at a time when a combustion gas of the turbine entrance temperature Ttin at the determination time tj is adiabatically expanded with an expiation ratio of the turbine 30 at the determination time tj. The expansion ratio of the turbine 30 at the determination time tj is a ratio (Ptin/Pi) between an intake air pressure Pi measured by the intake air pressure gauge 43 at the determination time tj and a pressure Ptin that is lower than the discharge pressure Pc measured by the discharge pressure gauge 45 at the determination time tj by a pressure loss of the combustor. Thus, the turbine efficiency ηt can be acquired using the turbine entrance temperature Ttin, the second exhaust gas temperature Te2, the intake air pressure Pi, and the discharge pressure Pc. In addition, in a case in which a part of the air compressed by the compressor 10 is used for cooling turbine blades and turbine vanes that are in contact with a combustion gas of a high temperature among the components configuring the turbine 30, the temperature and the flow rate of this air are also taken into account.

The output unit 140 outputs a plurality of types of evaluation index values acquired by the evaluation index value calculating unit 130 in accordance with an instruction from the outside.

As above, the operations of the performance evaluating device 100 have been described.

In this embodiment, a cavity temperature Tr measured by the cavity temperature indicator 49 is used from a point of view of protecting the rotor shaft of the turbine rotor 31 from heat of the combustion gas when a fuel flow rate and the like are determined by the control device 50.

When the turbine entrance temperature Ttin becomes high, an inner diameter of the turbine casing 35 increases in accordance with thermal expansion of the turbine casing 35, and an outer diameter of the rotor shaft 32 increases in accordance with thermal expansion of the rotor shaft 32 of the turbine rotor 31. Since the heat capacity of the turbine casing 35 is smaller than the heat capacity of the rotor shaft 32, when the turbine entrance temperature Ttin becomes high, first, the inner diameter of the turbine casing 35 increases, and thereafter, the outer diameter of the rotor shaft 32 increases. Thus, when the turbine entrance temperature Ttin becomes high, a difference between the inner diameter of the turbine casing 35 and the outer diameter of the rotor shaft 32 becomes large temporarily, and thereafter, this difference becomes small. For this reason, when the turbine entrance temperature Ttin becomes high, as illustrated in FIG. 2, a gap size between the seal 37e of the turbine vane attached to the diameter direction inner side Dri of the turbine casing 35 and the rotor shaft 32 temporarily becomes large, and thereafter this gap size becomes small. When the gap size between the seal 37e of the turbine vane 37 and the rotor shaft 32 becomes large, a flow rate of a combustion gas G in accordance with a part of the combustion gas G inside the combustion gas flow passage 39 flowing from a gap between the inner shroud 37c of this turbine vane 37 and the platform 34c of the turbine blade 34 adjacent to the axis line upstream side Dau of this turbine vane 37 into a cavity between the inner shroud 37c of this turbine vane 37 and the rotor shaft 32 becomes high. As a result, when the gap size between the seal 37e of the turbine vane 37 and the rotor shaft 32 becomes large, the cavity temperature Tr rises. Thus, the cavity temperature Tr has a correlation with the gap size between the seal 37e of the turbine vane 37 and the rotor shaft 32.

When the turbine entrance temperature Ttin changes, and the flow rate of the combustion gas G flowing into the cavity changes, the second exhaust gas temperature Te2 used when the turbine efficiency ηt described above is acquired changes as well. For this reason, even when a turbine efficiency ηt is acquired using the turbine entrance temperature Ttin, the second exhaust gas temperature Te2, and the like acquired in the process in which the flow rate of the combustion gas G flowing into the cavity is changing, this turbine efficiency ηt cannot be determined to be an appropriate turbine efficiency.

Thus, in this embodiment, a cavity temperature Tr is acquired as one type of static operation determination data, and under a condition that this cavity temperature Tr is determined to be stationary, a turbine efficiency ηt that is one type of evaluation index value is acquired using evaluation value data at this determination time. Thus, in this embodiment, a turbine efficiency ηt that is appropriate for evaluating the performance can be acquired.

In this embodiment, the first exhaust gas temperature Te1 measured by the first exhaust gas temperature indicator 47 is used by the control device 50 for determining whether or not a certain combustor 20 among a plurality of combustors 20 aligned in the circumferential direction Dc has a malfunction. For this reason, the first exhaust gas temperature indicator 47 measures a temperature of an exhaust gas at a position of the axis line downstream side Dad of the turbine blade row of the final stage at which a combustion gas that has flown from each of the plurality of combustors 20 aligned in the circumferential direction Dc into the inside of the combustion gas flow passage 39 inside the turbine casing 35 is assumed not to be mixed much in the circumferential direction Dc as the first exhaust gas temperature Te1. In addition, the second exhaust gas temperature Te2 measured by the second exhaust gas temperature indicator 48 is used from a point of view of protecting the exhaust duct 7 from heat of the exhaust gas when the control device 50 determines a fuel flow rate and the like. For this reason, the second exhaust gas temperature indicator 48 measures a temperature of the exhaust gas EG at a position of the axis line downstream side Dad of the turbine blade row of the final stage at which the combustion gas G flowing from each of the plurality of combustors 20 aligned in the circumferential direction Dc into the inside of the combustion gas flow passage 39 is assumed to be sufficiently mixed in the circumferential direction Dc as the second exhaust gas temperature Te2.

Since the second exhaust gas temperature indicator 48 is positioned on the axis line downstream side Dad of the first exhaust gas temperature indicator 47, even when the first exhaust gas temperature Te1 measured by the first exhaust gas temperature indicator 47 changes after the turbine entrance temperature Ttin changes, the second exhaust gas temperature Te2 measured by the second exhaust gas temperature indicator 48 does not immediately change. In other words, a responsiveness of the change of the second exhaust gas temperature Te2 with respect to the change of the turbine entrance temperature Ttin is lower than a responsiveness of the change of the first exhaust gas temperature Te1 with respect to the change of the turbine entrance temperature Ttin. Thus, when the turbine entrance temperature Ttin changes, an exhaust gas temperature difference Td that is a difference between the first exhaust gas temperature Te1 and the second exhaust gas temperature Te2 also changes. For this reason, even when a turbine efficiency ηt is acquired using the turbine entrance temperature Ttin, the second exhaust gas temperature Te2, and the like acquired in the process in which the exhaust gas temperature difference Td is changing, this turbine efficiency ηt cannot be determined to be an appropriate turbine efficiency.

Thus, in this embodiment, an exhaust gas temperature difference Td is acquired as one type of static operation determination data, and under the condition that this exhaust gas temperature difference Td is determined to be stationary, by using the evaluation value data of this determination time, a turbine efficiency ηt that is one type of evaluation index value is acquired. Thus, in this embodiment, a turbine efficiency ηt that is appropriate for evaluating the performance can be acquired.

However, a time in which the exhaust gas temperature difference Td becomes almost constant after the turbine entrance temperature Ttin changes is several tens of seconds. In addition, a time in which the cavity temperature Tr becomes almost constant after the turbine entrance temperature Ttin changes is several tens of minutes or more. Furthermore, even when the exhaust gas temperature difference Td becomes almost constant, it cannot be determined that the cavity temperature Tr becomes almost constant. To the contrary, even when the cavity temperature Tr becomes almost constant, it cannot be determined that the exhaust gas temperature difference Td becomes almost constant. For this reason, in order to determinate that the gas turbine 1 is static operation state, it is preferable that the exhaust gas temperature difference Td and the cavity temperature Tr be acquired as static operation determination data, and both pieces of the static operation determination data be determined to be stationary. For this reason, in this embodiment, the exhaust gas temperature difference Td and the cavity temperature Tr are acquired as static operation determination data.

Even in a case in which the static operation determination data is determined to be stationary within the first period T1, there are cases in which the static operation determination data is determined not to be stationary within the second period T2 longer than the first period T1. To the contrary, even in a case in which the static operation determination data is determined not to be stationary within the first period T1, there are also cases in which the static operation determination data is determined to be stationary within the second period T2. Thus, in this embodiment, for each of a plurality of types of static operation determination data, it is determined whether or not the static operation determination data is stationary during two periods different from each other. For this reason, in this embodiment, determination of whether or not the gas turbine 1 is in the static operation state can be performed with high accuracy, and as a result, an evaluation index value that is appropriate for evaluating the performance can be acquired.

Modified Example of Short-Term Static Operation Determining Unit

A modified example of the short-term static operation determining unit described above will be described with reference to FIGS. 8 and 9.

Figure 8:
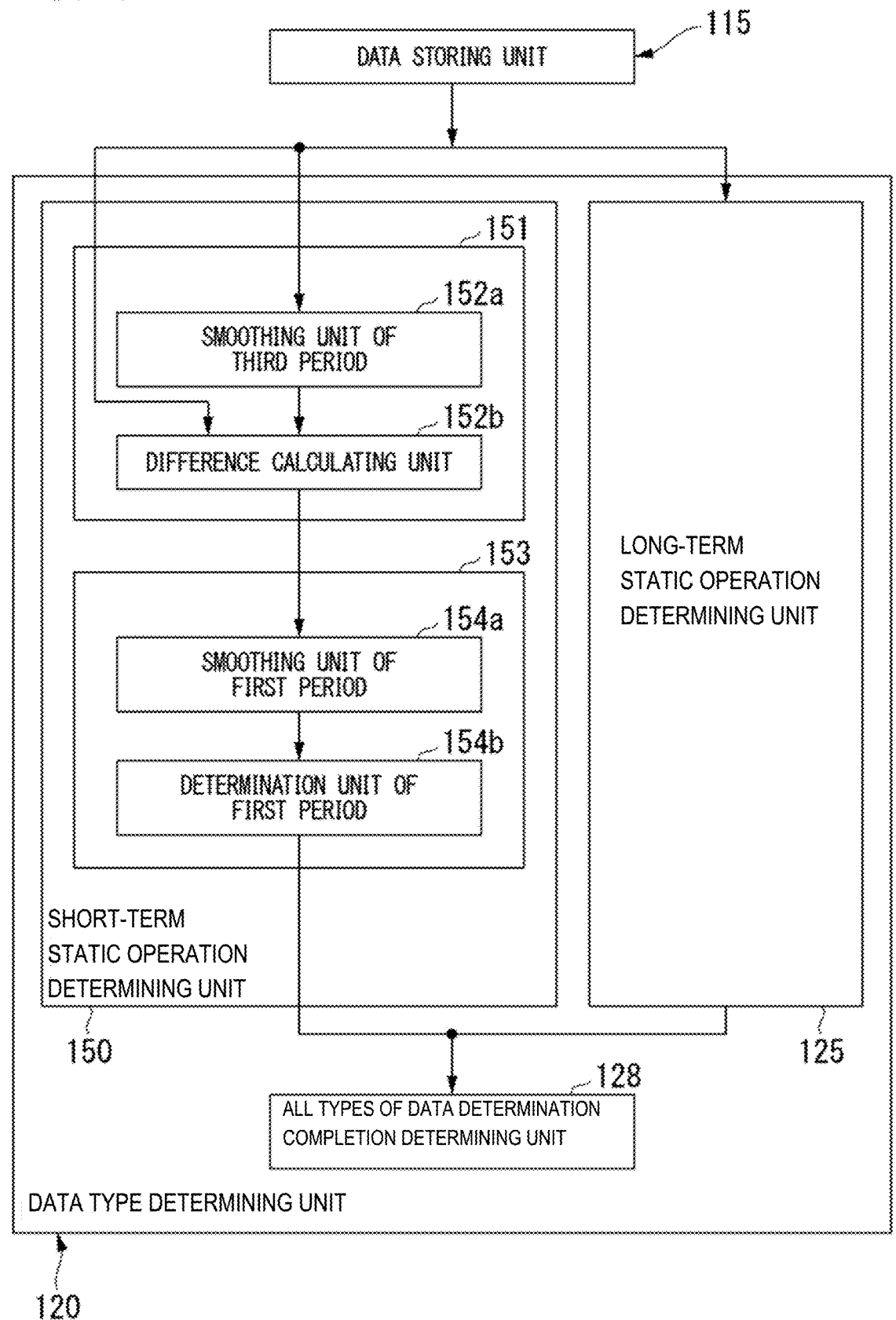
FIG. 8 is a functional block diagram of a short-term static operation determining unit of a modified example of an embodiment according to the present disclosure.

As illustrated in FIG. 8, a short-term static operation determining unit 150 according to this modified example includes a determination pre-processing unit 151 and a first period data determining unit 153. The determination pre-processing unit 151 includes a smoothing unit 152a of a third period T3 shorter than the first period T1 and a difference calculating unit 152b. Here, for example, the third period T3 is a period of about 3 minutes to 8 minutes. The first period data determining unit 153 includes a smoothing unit 154a of the first period T1 and a determination unit 154b of the first period T1.

Figure 9:
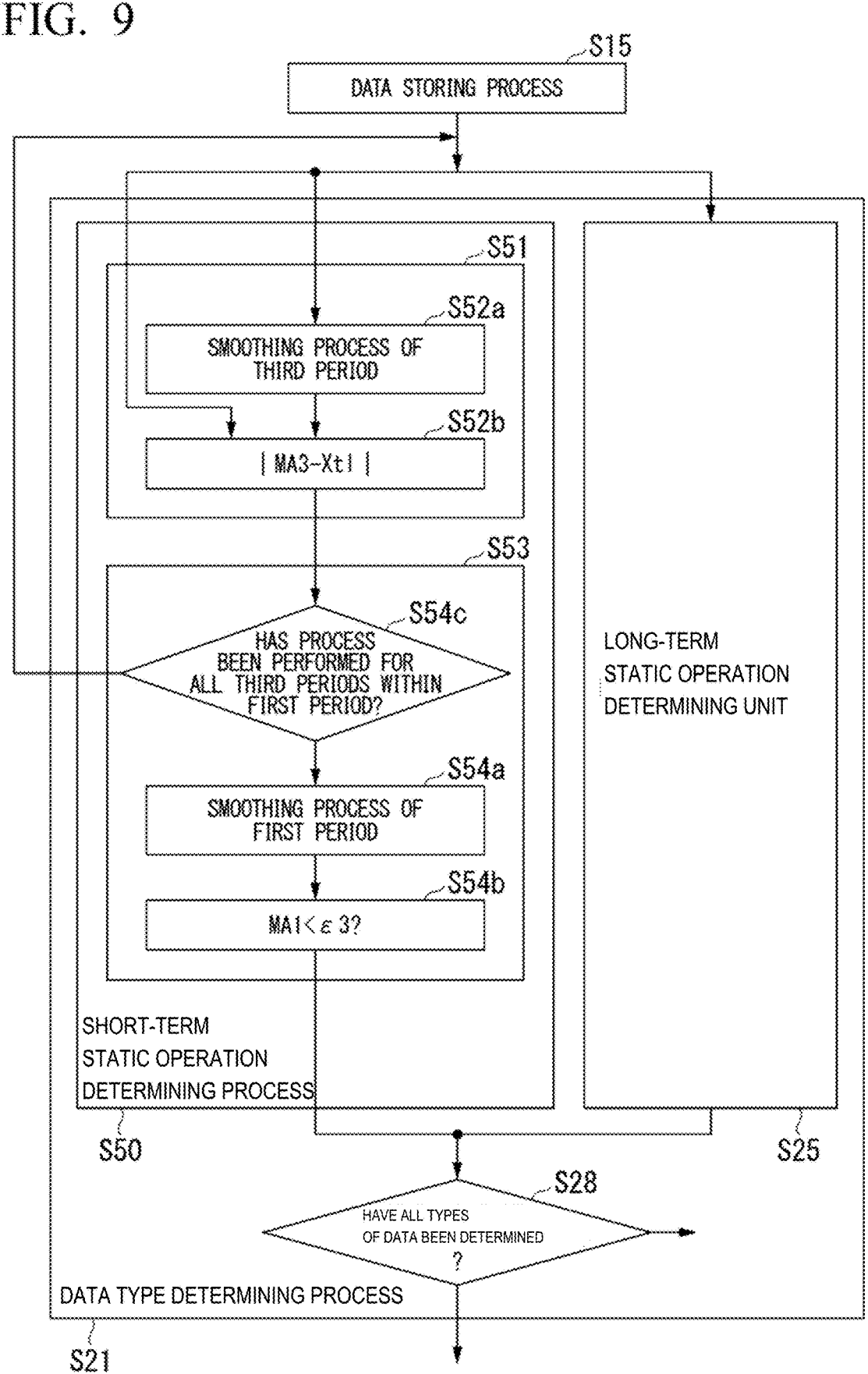
FIG. 9 is a flowchart illustrating operations of a short-term static operation determining unit in a modified example of an embodiment according to the present disclosure.

Next, operations of the short-term static operation determining unit 150 according to this modified example will be described along a flowchart illustrated in FIG. 9.

The determination pre-processing unit 151 of the short-term static operation determining unit 150 according to this modified example performs a determination pre-processing process S51. In this determination pre-processing process S51, the smoothing unit 154a of the third period T3 of the determination pre-processing unit 151 extracts static operation determination data of each of a plurality of times in the third period T3 in the past from at the time of determination pre-processing from among static operation determination data for each of a plurality of times stored by the data storing unit 115 and smooths the extracted static operation determination data for each of the plurality of times (a smoothing process S54a of the third period). In addition, in this determination pre-processing process S51, the difference calculating unit 152b of the determination pre-processing unit 151 acquires the absolute value |MA3−Xtl| of a difference between the static operation determination data MA3 smoothed in the smoothing process S54a and latest static operation determination data Xtl among static operation determination data of each of plurality of times.

A first period data determining unit 153 of the short-term static operation determining unit 150 according to this modified example performs a first period determination process S53. In this first period determination process S53, first, the smoothing unit 154a of the first period T1 of the first period data determining unit 153 determines whether or not the determination pre-processing process S51 has been performed for all the third periods T3 within the first period T1 (determination process S54c of determination pre-processing completion). When it is determined that the determination pre-processing process S51 has not been performed for all the third periods T3 within the first period T1, the smoothing unit 154a of the first period T1 waits until the determination pre-processing unit 151 performs the determination pre-processing process S51 for all the third periods T3 within the first period T1. When it is determined that the determination pre-processing process S51 has been performed for all the third periods T3 within the first period T1, the smoothing unit 154a of the first period T1 smooths the absolute value |MA3−Xtl| of each difference acquired in all the determination pre-processing processes S51 performed within the first period T1 (a smoothing process S54a of the first period). Next, the determination unit 154b of the first period T1 determines whether or not the absolute value MA1 of the difference smoothed in the smoothing process S54a of the first period T1 is less than a value &3 set in advance (determination process S54b of the first period). In a case in which the absolute value MA1 of the difference smoothed in the smoothing process S54a of the first period T1 is less than the value &3 set in advance, the determination unit 154b of the first period T1 determines that this static operation determination data is stationary within the first period T1.

As above, the first period determination process S53 ends, and the short-term static operation determining process S50 according to this modified example ends. When it is determined that the static operation determination data is stationary within the first period T1 in the first period determination process S53, similar to the embodiment described above, it is determined whether or not the determination of the short-term static operation determining process S50 has been completed for all the types of static operation determination data (determination completion determining process S28).

In the short-term static operation determining process S50 according to this modified example, in the processing procedure as above, even in a case in which it is determined that static operation determination data within one third period T3 in the first period T1 is stationary, in a case in which it is determined that static operation determination data within another third period T3 in the first period T1 is not stationary, the static operation determination data is not determined to be stationary within the first period T1. In other words, in the short-term static operation determining process S50 according to this modified example, not only the third period T3 shorter than the first period T1 but also the first period T1 is taken into account. In other words, in the short-term static operation determining process S50 according to this modified example, not only the first period T1 but also the third period T3 shorter than the first period T1 is taken into account.

For this reason, in this modified example, it can be determined whether or not static operation determination data is stationary within the first period T1 with the third period T3 shorter than the first period T1 taken into account.

Other Modified Example

In the embodiments and the modified example described above, the first period T1 is a period that is common to a plurality of types of static operation determination data. In addition, in the embodiments and the modified example described above, also the second period T2 and the third period T3 are periods that are common to a plurality of types of static operation determination data. However, for each of a plurality of types of static operation determination data, the first period T1, the second period T2, and the third period T3 may be set. However, also in this case, the second period T2 needs to be a period longer than the first period T1, and the third period T3 needs to be a period shorter than the first period T1.

In the embodiments and the modified example described above, for a plurality of types of static operation determination data, it is determined whether or not the data is stationary in two periods different from each other. However, for a plurality of types of static operation determination data, it may be determined whether or not the data is stationary only in one period. However, in order to perform determination of whether or not the gas turbine 1 is in the static operation state with high accuracy, for a plurality of types of static operation determination data, it is preferable to determine whether or not the data is stationary in two periods different from each other.

The present disclosure not limited to the embodiments and the modified example described above. In a range not departing from the conceptual idea and the gist of the present invention derived from details defined in the claims and equivalents thereof, various additions, changes, substitutions, partial omissions, and the like can be performed.

Supplementary Note

A method of evaluating performance of a gas turbine 1 according to the embodiments and the modified examples described above, for example, can be perceived as below.

(1) A performance evaluating method for a gas turbine according to a first aspect is applied to the following gas turbine.

This gas turbine 1 includes a compressor 10 configured to be able to generate compressed air Acom by compressing air A, a combustor 20 configured to be able to generate a combustion gas G by combusting a fuel F in the compressed air Acom, and a turbine 30 configured to be able to be driven using the combustion gas. The turbine 30 described above includes a rotor 31 configured to be able to rotate around an axis line Ar as its center, a turbine casing 35 covering an outer circumference of the rotor 31, a plurality of turbine vane rows 36 disposed on an inner circumferential side of the turbine casing 35, and an exhaust duct 7 through which an exhaust gas EG that is a combustion gas G discharged from the turbine casing 35 is able to circulate. The plurality of turbine vane rows 36 are aligned with gaps interposed therebetween in an axis line direction Da in which the axis line Ar extends. Each of the plurality of turbine vane rows 36 described above includes a plurality of turbine vanes 37 aligned in a circumferential direction Dc with respect to the axis line Ar. The turbine vane 37 described above includes a vane body 37a, of which a cross-sectional shape perpendicular to a diameter direction Dr with respect to the axis line Ar forms a vane shape, extending in the diameter direction Dr, an inner shroud 37c disposed on a diameter direction inner side Dri of the vane body 37a, and an outer shroud 37b disposed on a diameter direction outer side Dro of the vane body 37a. The rotor 31 described above includes a rotor shaft 32 extending in the axis line direction Da with the axis line Ar as its center and a plurality of turbine blade rows 33 attached to the rotor shaft 32. Each of the plurality of turbine blade rows 33 described above is disposed on an axis line downstream side Dad out of an axis line upstream side Dau and the axis line downstream side Dad in the axis line direction Da with respect to any one turbine vane row 36 among the plurality of turbine vane rows 36. Each of the plurality of turbine blade rows 33 described above includes a plurality of turbine blades 34 aligned in the circumferential direction Dc.

The method of evaluating performance of the gas turbine 1 includes: acquiring at least one piece of static operation determination data for determining whether or not the gas turbine 1 is static operation state and acquiring index value data for acquiring an evaluation index value used for a performance evaluation of the gas turbine 1 (S10); storing the data acquired in the acquiring of static operation determination data and acquiring of index value data (S10) in a time series (S15); performing a data determining process (S23, S26, S53) of extracting the static operation determination data of each of a plurality of times in a period in the past set in advance from a determination time from the static operation determination data for each of the plurality of times stored in the storing of the data (S15) and determining whether or not the extracted static operation determination data of each of the plurality of times enters a range of a variation width set in advance and determining whether or not the gas turbine 1 is in a static operation state in accordance with a result of the data determining process (S23, S26, S53) (S20); and acquiring the evaluation index value (S30) using the index value data of the determination time at which the gas turbine 1 is determined to be in the static operation state in the determining of whether or not the gas turbine 1 is in the static operation state (S20). At least one piece of the static operation determination data described above is an exhaust gas temperature difference Td that is a difference between a first exhaust gas temperature Te1 that is a temperature of an exhaust gas EG that has passed through a turbine blade row of a final stage that is a turbine blade row 33 of the axis line furthest downstream side Dad among the plurality of turbine blade rows 33 and a second exhaust gas temperature Te2 that is the temperature of the exhaust gas EG at a position further away from the turbine blade row of the final stage than a position at which the first exhaust gas temperature Te1 is measured or a cavity temperature Tr between the inner shroud 37c of the turbine vane 37 and the rotor shaft 32.

As a representative value of the evaluation index value of the gas turbine 1, there is turbine efficiency $\eta t$ that is efficiency of the single turbine 30. This turbine efficiency $\eta t$ can be acquired using a turbine entrance temperature Ttin and a second exhaust gas temperature Te2. The turbine entrance temperature Ttin is a temperature of a combustion gas G at the entrance of the turbine 30 into which a combustion gas G flows from the combustor 20.

When the turbine entrance temperature Ttin becomes high, an inner diameter of the turbine casing 35 increases in accordance with thermal expansion of the turbine casing 35, and an outer diameter of the rotor shaft 32 increases in accordance with thermal expansion of the rotor shaft 32 of the turbine rotor 31. Since the heat capacity of the turbine casing 35 is smaller than the heat capacity of the rotor shaft 32, when the turbine entrance temperature Ttin becomes high, first, the inner diameter of the turbine casing 35 increases, and thereafter, the outer diameter of the rotor shaft 32 increases. Thus, when the turbine entrance temperature Ttin becomes high, a difference between the inner diameter of the turbine casing 35 and the outer diameter of the rotor shaft 32 becomes large temporarily, and thereafter, this difference becomes small. For this reason, when the turbine entrance temperature Ttin becomes high, a gap size between the seal 37e of the turbine vane 37 attached to the diameter direction inner side Dri of the turbine casing 35 and the rotor shaft 32 temporarily becomes large, and thereafter this gap size becomes small. When the gap size between the seal 37e of the turbine vane 37 and the rotor shaft 32 become large, a flow rate of a combustion gas G in accordance with a part of the combustion gas G inside the combustion gas flow passage 39 flowing from a gap between the inner shroud 37c of this turbine vane 37 and the platform 34c of the turbine blade 34 adjacent to the axis line upstream side Dau of this turbine vane 37 into a cavity between the inner shroud 37c of this turbine vane 37 and the rotor shaft 32 becomes high. As a result, when the gap size between the seal 37e of the turbine vane 37 and the rotor shaft 32 becomes large, the cavity temperature Tr rises. Thus, the cavity temperature Tr has a correlation with the gap size between the seal 37e of the turbine vane 37 and the rotor shaft 32.

When the turbine entrance temperature Ttin changes, and the flow rate of the combustion gas G flowing into the cavity changes, the second exhaust gas temperature Te2 used when the turbine efficiency ηt described above is acquired changes as well. For this reason, even when a turbine efficiency ηt is acquired using the turbine entrance temperature Ttin, the second exhaust gas temperature Te2, and the like acquired in the process in which the flow rate of the combustion gas G flowing into the cavity is changing, this turbine efficiency ηt cannot be determined to be an appropriate turbine efficiency.

The second exhaust gas temperature Te2 is a temperature of an exhaust gas EG at a position further away from the turbine blade row of a final stage than a position at which the first exhaust gas temperature Te1 is measured. For this reason, even when the first exhaust gas temperature Te1 changes after the turbine entrance temperature Ttin changes, the second exhaust gas temperature Te2 does not immediately change. In other words, a responsiveness of the change of the second exhaust gas temperature Te2 with respect to the change of the turbine entrance temperature Ttin is lower than a responsiveness of the change of the first exhaust gas temperature Te1 with respect to the change of the turbine entrance temperature Ttin. Thus, when the turbine entrance temperature Ttin changes, an exhaust gas temperature difference Td that is a difference between the first exhaust gas temperature Te1 and the second exhaust gas temperature Te2 also changes. For this reason, even when a turbine efficiency ηt is acquired using the turbine entrance temperature Ttin, the second exhaust gas temperature Te2, and the like acquired in the process in which the exhaust gas temperature difference Td is changing, this turbine efficiency ηt cannot be determined to be an appropriate turbine efficiency ηt.

Thus, in this aspect, a cavity temperature Tr or an exhaust gas temperature difference Td is acquired as one type of static operation determination data, and under the condition that this exhaust gas temperature difference Td is determined to be stationary, by using the evaluation value data of this determination time, a turbine efficiency ηt that is one type of evaluation index value is acquired. Thus, in this embodiment, an evaluation index value that is appropriate for evaluating the performance can be acquired.

(2) In a method of evaluating performance of the gas turbine according to a second aspect, in the method of evaluating performance of the gas turbine according to the first aspect, the determining of whether or not the gas turbine is in the static operation state (S20) includes: performing a data determining process (S23, S53) of extracting the static operation determination data of each of a plurality of times in a first period T1 in the past set in advance from a determination time from the static operation determination data for each of the plurality of times stored in the storing of the data (S15) and determining whether or not the extracted static operation determination data of each of the plurality of times enters a range of a variation width set in advance and determining whether or not the static operation determination data is stationary in the first period T1 in accordance with a result of the data determining process (S23, S53) (S22, S50); performing a data determining process (S25) of extracting the static operation determination data of each of a plurality of times in a second period T2, which is longer than the first period T1, in the past set in advance from a determination time from the static operation determination data for each of the plurality of times stored in the storing of the data (S15) and determining whether or not the extracted static operation determination data of each of the plurality of times enters a range of a variation width set in advance and determining whether or not the static operation determination data is stationary in the second period T2 in accordance with a result of the data determining process (S26); and determining that the gas turbine is in the static operation state under the condition that the static operation determination data is determined to be stationary in the first period T1 and the second period T2 (S29).

Even in a case in which the static operation determination data is determined to be stationary within the first period T1, there are cases in which the static operation determination data is determined not to be stationary within the second period T2 longer than the first period T1. To the contrary, even in a case in which the static operation determination data is determined not to be stationary within the first period T1, there are cases in which the static operation determination data is determined to be stationary within the second period T2. In such a case, even when the gas turbine 1 is determined to be in the static operation state, and an evaluation index value is acquired using the index value data of this time, an evaluation index value that is appropriate for a performance evaluation cannot be acquired.

In this aspect, under the condition that the static operation determination data is determined to be stationary in the first period T1 and the second period T2, the gas turbine 1 is determined to be in the static operation state, and thus an evaluation index value that is appropriate for a performance evaluation can be acquired.

(3) In a method of evaluating performance of the gas turbine according to a third aspect, in the method of evaluating performance of the gas turbine according to the first aspect, in the acquiring of static operation determination data and acquiring of index value data (S10), a plurality of types of static operation determination data including the exhaust gas temperature difference Td and the cavity temperature Tr are acquired as the at least one piece of the static operation determination data. The determining of whether or not the gas turbine is in the static operation state (S20) includes: performing a data determining process (S23, S26, S53) of determining whether or not each of the plurality of types of static operation determination data enters a range of a variation width set in advance for each of the plurality of types of static operation determination data and determining whether or not each of the plurality of types of static operation determination data is stationary (S21) in accordance with a result of the data determining process (S23, S26, S53); and determining that the gas turbine 1 is in the static operation state under the condition that the exhaust gas temperature difference Td and the cavity temperature Tr are determined to be stationary (S29) in the determining of whether or not each of the plurality of types of static operation determination data is stationary (S21).

A time in which the exhaust gas temperature difference Td becomes almost constant after the turbine entrance temperature Ttin changes is several tens of seconds. In addition, a time in which the cavity temperature Tr becomes almost constant after the turbine entrance temperature Ttin changes is several tens of minutes or more. Furthermore, even when the exhaust gas temperature difference Td becomes almost constant, it cannot be determined that the cavity temperature Tr becomes almost constant. To the contrary, even when the cavity temperature Tr becomes almost constant, it cannot be determined that the exhaust gas temperature difference Td becomes almost constant. For this reason, in order to acquire a plurality of types of static operation determination data including the exhaust gas temperature difference Td and the cavity temperature Tr and determine that the gas turbine 1 is static operation state, it is preferable that a plurality of types of static operation determination data be determined to be stationary. For this reason, in this aspect, a plurality of types of static operation determination data including the exhaust gas temperature difference Td and the cavity temperature Tr are acquired as static operation determination data, and the gas turbine 1 is determined to be in the static operation state under the condition that the exhaust gas temperature difference Td and the cavity temperature Tr are determined to be stationary. Thus, in this aspect, an evaluation index value that is appropriate for a performance evaluation can be acquired.

(4) In a method of evaluating performance of the gas turbine according to a fourth aspect, in the method of evaluating performance of the gas turbine according to the third aspect, the determining of whether or not each of the plurality of types of static operation determination data is stationary (S21) includes a short-term static operation determining process (S22, S50) and a long-term static operation determining process (S25) performed for each of the plurality of types of static operation determination data. In the short-term static operation determining process (S22, S50), a data determining process (S23, S53) of extracting the static operation determination data of each of a plurality of times in a first period in the past set in advance from a determination time from the static operation determination data for each of the plurality of times stored in the storing of the data (S15) and determining whether or not the extracted static operation determination data of each of the plurality of times enters a range of a variation width set in advance for the static operation determination data is performed, and it is determined whether or not the static operation determination data is stationary in the first period T1 in accordance with a result of the data determining process (S23, S53). In the long-term static operation determining process (S25), a data determining process (S26) of extracting the static operation determination data of each of a plurality of times in a second period T2, which is longer than the first period T1, in the past set in advance from a determination time from the static operation determination data for each of the plurality of times stored in the storing of the data (S15) and determining whether or not the extracted static operation determination data of each of the plurality of times enters a range of a variation width set in advance for the static operation determination data is performed, and it is determined whether or not the static operation determination data is stationary in the second period in accordance with a result of the data determining process (S26). In the determining of the gas turbine to be in the static operation state (S29), the gas turbine 1 is determined to be in the static operation state under the condition that any one of the plurality of types of static operation determination data is determined to be stationary in the first period T1 and the second period T2.

In this aspect, similar to the performance evaluating method according to the third aspect, for each of a plurality of types of static operation determination data, it is determined whether or not the static operation determination data is stationary, and, similar to the performance evaluating method according to the second aspect, it is determined whether or not the static operation determination data is stationary during two periods that are periods different from each other. For this reason, in this aspect, determination of whether or not the gas turbine 1 is in the static operation state can be performed with high accuracy, and as a result, an evaluation index value that is appropriate for evaluating the performance can be acquired.

(5) In a method of evaluating performance of the gas turbine according to a fifth aspect, in the method of evaluating performance of the gas turbine according to the third aspect or the fourth aspect, in the acquiring of static operation determination data and acquiring of index value data (S10), at least one of an output PW of the gas turbine 1 and a temperature Ti of air sucked in by the compressor 10 is additionally acquired as the plurality of types of static operation determination data.

In this aspect, as a plurality of types of static operation determination data, in addition to the exhaust gas temperature difference Td and the cavity temperature Tr, at least one of the output PW of the gas turbine 1 and the temperature Ti of air sucked in by the compressor 10 is acquired. For this reason, in this aspect, determination of whether or not the gas turbine 1 is in the static operation state can be performed with high accuracy, and as a result, an evaluation index value that is appropriate for evaluating the performance can be acquired.

(6) In a method of evaluating performance of the gas turbine according to a sixth aspect, in the method of evaluating performance of the gas turbine according to any one of the first aspect to the fifth aspect, the determining of whether or not the gas turbine is in the static operation state (S23, S26) includes smoothing the static operation determination data for each of the plurality of times during a period (S24a, S27a) and determining that the static operation determination data of each of the plurality of times during the period enters the range of the variation width for the static operation determination data (S24b, S27b) in a case in which an absolute value of a difference between the static operation determination data smoothed in the smoothing of the static operation determination data (S24a, S27a) and the static operation determination data of the determination time is less than a value set in advance.

(7) In a method of evaluating performance of the gas turbine according to a seventh aspect, in the method of evaluating performance of the gas turbine according to the second aspect or the fourth aspect, the short-term static operation determining process (S50) includes a determination pre-processing process (S51) and a first period determination process (S53).

The determination pre-processing process (S51) includes a smoothing process (S52a) of extracting the static operation determination data of each of a plurality of times in a third period T3, which is shorter than the first period T1, that is a period in the past from determination pre-processing among the static operation determination data of each of a plurality of times stored in the storing of the data (S15) and smoothing the extracted static operation determination data of each of the plurality of times (S52a) and a difference calculating process (S52b) of acquiring an absolute value of a difference between latest static operation determination data among the static operation determination data of each of the plurality of times and the static operation determination data smoothed in the smoothing process. The determination pre-processing process (S51) is performed a plurality of number of times in the first period T1 in the past from the determination time. The first period determination process (S53) includes a smoothing process (S54a) of smoothing an absolute value of each difference acquired in the plurality of number of times of the determination pre-processing process (S51) performed in the first period T1 and a determination process (S54b) of determining that the static operation determination data is stationary in a case in which the absolute value of the difference smoothed in the smoothing process (S54a) is less than a value set in advance.

In this aspect, in the short-term static operation determining process S50, even in a case in which it is determined that static operation determination data within one third period T3 in the first period T1 is stationary, in a case in which it is determined that static operation determination data within another third period T3 in the first period T1 is not stationary, the static operation determination data is not determined to be stationary within the first period T1. In other words, in the short-term static operation determining process S50 according to this aspect, not only the third period T3 shorter than the first period T1 but also the first period T1 is taken into account. In other words, in the short-term static operation determining determining process S50 according to this aspect, not only the first period T1 but also the third period T3 shorter than the first period T1 is taken into account.

For this reason, in this aspect, it can be determined whether or not static operation determination data is stationary within the first period T1 with the third period T3 shorter than the first period T1 taken into account.

(8) In a method of evaluating performance of the gas turbine according to an eighth aspect, in the method of evaluating performance of the gas turbine according to the sixth aspect or the seventh aspect, in the smoothing process described above (S24a, S27a, S52a, S54a), an exponential moving average value of a plurality of pieces of target data is acquired, and the exponential moving average value is set as data acquired by smoothing the plurality of pieces of target data.

As kinds of moving average values, there are a simple moving average value, a weighted moving average value, and an exponential moving average value. Regarding the exponential moving average value, among ratios of state quantities for a plurality of samples for acquiring this exponential moving average value, as a state quantity of a sample becomes further closer to a determination time, the ratio thereof exponentially increases. For this reason, among such kinds of moving average values, the exponential moving average value is a moving average value in which the influence of a state quantity of a sample close to the determination time is the highest.

For example, it is assumed that, among a plurality of state quantities during a period, a state quantity $X_{tj}$ at the determination time tj has an approximately predetermined value Xp, some of state quantities at times t(j−1), t(j−2), and t(j−3) close to this determination time tj have values greatly different from the predetermined value Xp, and all the state quantities at the other times t(j−4), t(j−5), . . . , t(j−(n−1)) have almost predetermined values Xp. In this case, even when the state quantity $X_{tj}$ of the determination time tj is almost a predetermined value Xp, the value of the exponential moving average EMA relating to the state quantity X of each time during the period Tis larger than the value of the simple moving average SMA relating to state quantities X of each time during the period T. For this reason, even in a case in which static operation determination data is determined to be stationary during a period when the value of a simple moving average SMA of the static operation determination data for a plurality of times during a period T is used as data acquired by smoothing the static operation determination data for the plurality of times during the period T, there are cases in which the static operation determination data is determined not to be stationary during a period when the value of an exponential moving average EMA of the static operation determination data for a plurality of times during the period T is used as data acquired by smoothing the static operation determination data for the plurality of times during the period T.

Thus, by using the exponential moving average value as data acquired by smoothing a plurality of pieces of target data, determination on whether or not the static operation determination data is stationary can be performed with high accuracy.

(9) In a method of evaluating performance of the gas turbine according to a ninth aspect, in the method of evaluating performance of the gas turbine according to any one of the first aspect to the eighth aspect described above, in the acquiring of static operation determination data and acquiring of index value data (S10), as the index value data, an intake air temperature Ti that is a temperature of intake air sucked in by the compressor 10, an intake air pressure Pi that is a pressure of the intake air, a discharge air temperature Tc that is a temperature of a compressed air discharged by the compressor 10, a discharge pressure Pc that is a pressure of the compressed air, a fuel flow rate Fr flowing into the combustor 20, the second exhaust gas temperature Te2, and an output PW of the gas turbine 1 are acquired. In the acquiring of the evaluation index value (S30), a turbine entrance temperature Ttin that is a temperature of the combustion gas at an entrance of the turbine 30 into which the combustion gas from the combustor 20 flows by using the intake air temperature Ti, the intake air pressure Pi, the discharge air temperature Tc, the discharge pressure Pc, the fuel flow rate Fr, the second exhaust gas temperature Te2 and the output PW of the gas turbine 1 of the determination time at which the gas turbine 1 is determined to be in the static operation state in the determining of whether or not the gas turbine is in the static operation state (S20).

(10) In a method of evaluating performance of the gas turbine according to a 10th aspect, in the method of evaluating performance of the gas turbine according to any one of the first aspect to the ninth aspect described above, in the acquiring of static operation determination data and acquiring of index value data (S10), as the index value data, an intake air temperature Ti that is a temperature of intake air sucked in by the compressor 10, an intake air pressure Pi that is a pressure of the intake air, a discharge air temperature Tc that is a temperature of a compressed air discharged by the compressor 10, a discharge pressure Pc that is a pressure of the compressed air, a fuel flow rate flowing into the combustor 20, the second exhaust gas temperature Te2, and an output PW of the gas turbine 1 are acquired. In the acquiring of the evaluation index value (S30), efficiency ηt of the turbine 30 is acquired using the intake air temperature Ti, the intake air pressure Pi, the discharge air temperature Tc, the discharge pressure Pc, the fuel flow rate, the second exhaust gas temperature Te2 and the output PW of the gas turbine 1 of the determination time at which the gas turbine 1 is determined to be in the static operation state in the determining of whether or not the gas turbine 1 is in the static operation state (S20).

(11) In a method of evaluating performance of the gas turbine according to a 11th aspect, in the method of evaluating performance of the gas turbine according to any one of the first aspect to the 10th aspect described above, in the acquiring of static operation determination data and acquiring of index value data (S10), as the index value data, an intake air temperature Ti that is a temperature of intake air sucked in by the compressor 10, an intake air pressure Pi that is a pressure of the intake air, a discharge air temperature Tc that is a temperature of a compressed air discharged by the compressor 10, and a discharge pressure Pc that is a pressure of the compressed air are acquired. In the acquiring of the evaluation index value (S30), efficiency ηc of the compressor 10 that is one type of evaluation index value is acquired using the intake air temperature Ti, the intake air pressure Pi, the discharge air temperature Tc, and the discharge pressure Pc of the determination time at which the gas turbine 1 is determined to be in the static operation state in the determining of whether or not the gas turbine is in the static operation state (S20).

A performance evaluating program 104*b* of a gas turbine 1 according to the embodiments and the modified examples described above, for example, can be perceived as below.

(12) A performance evaluation program of a gas turbine according to a 12th aspect is applied to the following gas turbine.

This gas turbine 1 includes a compressor 10 configured to be able to generate compressed air Acom by compressing air A, a combustor 20 configured to be able to generate a combustion gas G by combusting a fuel F in the compressed air Acom, and a turbine 30 configured to be able to be driven using the combustion gas. The turbine 30 described above includes a rotor 31 configured to be able to rotate around an axis line Ar as its center, a turbine casing 35 covering an outer circumference of the rotor 31, a plurality of turbine vane rows 36 disposed on an inner circumferential side of the turbine casing 35, and an exhaust duct 7 through which an exhaust gas EG that is a combustion gas G discharged from the turbine casing 35 is able to circulate. The plurality of turbine vane rows 36 are aligned with gaps interposed therebetween in an axis line direction Da in which the axis line Ar extends. Each of the plurality of turbine vane rows 36 described above includes a plurality of turbine vanes 37 aligned in a circumferential direction Dc with respect to the axis line Ar. The turbine vane 37 described above includes a vane body 37*a*, of which a cross-sectional shape perpendicular to a diameter direction Dr with respect to the axis line Ar forms a vane shape, extending in the diameter direction Dr, an inner shroud 37*c* disposed on a diameter direction inner side Dri of the vane body 37*a*, and an outer shroud 37*b* disposed on a diameter direction outer side Dro of the vane body 37*a*. The rotor 31 described above includes a rotor shaft 32 extending in the axis line direction Da with the axis line Ar as its center and a plurality of turbine blade rows 33 attached to the rotor shaft 32. Each of the plurality of turbine blade rows 33 described above is disposed on an axis line downstream side Dad out of an axis line upstream side Dau and the axis line downstream side Dad in the axis line direction Da with respect to any one turbine vane row 36 among the plurality of turbine vane rows 36. Each of the plurality of turbine blade rows 33 described above includes a plurality of turbine blades 34 aligned in the circumferential direction Dc.

This performance evaluation program of the gas turbine 1 causes a computer to execute: acquiring at least one piece of static operation determination data for determining whether or not the gas turbine 1 is static operation state and acquiring index value data for acquiring an evaluation index value used for a performance evaluation of the gas turbine 1 (S10); storing the data acquired in the acquiring of static operation determination data and acquiring of index value data (S10) in a time series (S15); performing a data determining process (S23, S26, S53) of extracting the static operation determination data of each of a plurality of times in a period in the past set in advance from a determination time from the static operation determination data for each of the plurality of times stored in the storing of the data (S15) and determining whether or not the extracted static operation determination data of each of the plurality of times enters a range of a variation width set in advance and determining whether or not the gas turbine 1 is in a static operation state in accordance with a result of the data determining process (S23, S26, S53) (S20); and acquiring the evaluation index value (S30) using the index value data of the determination time at which the gas turbine 1 is determined to be in the static operation state in the determining of whether or not the gas turbine 1 is in the static operation state (S20). At least one piece of the static operation determination data described above is an exhaust gas temperature difference Td that is a difference between a first exhaust gas temperature Te1 that is a temperature of an exhaust gas EG that has passed through a turbine blade row of a final stage that is a turbine blade row 33 of the axis line furthest downstream side Dad among the plurality of turbine blade rows 33 and a second exhaust gas temperature Te2 that is the temperature of the exhaust gas EG at a position further away from the turbine blade row of the final stage than a position at which the first exhaust gas temperature Te1 is measured or a cavity temperature Tr between the inner shroud 37*c* of the turbine vane 37 and the rotor shaft 32.

By causing a computer to execute the performance evaluation program according to this aspect, similar to the performance evaluating method according to the first aspect, the computer acquires a cavity temperature Tr or an exhaust gas temperature difference Td as one type of static operation determination data and, under the condition that this exhaust gas temperature difference Td is determined to be stationary, by using the evaluation value data of this determination time, acquires a turbine efficiency ηt that is one type of evaluation index value. Thus, also in this aspect, an evaluation index value that is appropriate for a performance evaluation can be acquired.

(13) In a performance evaluation program of a gas turbine according to a 13th aspect, in the performance evaluation program of a gas turbine according to the 12th aspect, the determining of whether or not the gas turbine is in the static operation state (S20) includes: performing a data determining process (S23, S53) of extracting the static operation determination data for each of a plurality of times in the first period T1 in the past set in advance from a determination time among the static operation determination data for a plurality of times stored in the storing of the data (S15) and determining whether or not the extracted static operation determination data for each of the plurality of times enters a range of a variation width set in advance and determining whether or not the static operation determination data is stationary in a first period T1 (S22, S50) in accordance with a result of the data determining process (S23, S53); performing the data determining process (S26) of extracting the static operation determination data for each of a plurality of times in the second period T2, which is longer than the first period T1, in the past set in advance from a determination time among the static operation determination data for a plurality of times stored in the storing of the data (S15) and determining whether or not the static operation determination data is stationary in a second period T2 (S25) in accordance with a result of the data determining process (S26); and determining that the gas turbine is in the static operation state under the condition that the static operation determination data is determined to be stationary in the first period T1 and the second period T2 (S29).

By causing a computer to execute the performance evaluation program according to this aspect, similar to the performance evaluating method according to the second aspect, the computer, under the condition that the static operation determination data is determined to be stationary in the first period T1 and the second period T2, determines the gas turbine 1 to be in the static operation state. Thus, also in this aspect, an evaluation index value that is appropriate for a performance evaluation can be acquired.

(14) In a performance evaluation program of a gas turbine according to a 14th aspect, in the performance evaluation program of a gas turbine according to the 12th aspect, in the acquiring of static operation determination data and acquiring of index value data (S10), a plurality of types of static operation determination data including the exhaust gas temperature difference Td and the cavity temperature Tr are acquired as the at least one piece of the static operation determination data.

The determining of whether or not the gas turbine is in the static operation state (S20) includes: determining whether or not each of the plurality of types of static operation determination data is stationary (S21) in accordance with a result of a data determining process (S23, S26, S53) by performing the data determining process (S23, S26, S53) of determining whether or not each of the plurality of types of static operation determination data enters a range of a variation width set in advance for each of the plurality of types of static operation determination data; and determining that the gas turbine 1 is in the static operation state under the condition that all the plurality of types of static operation determination data are determined to be stationary (S29) in the determining of whether or not each of the plurality of types of static operation determination data is stationary (S21).

By causing a computer to execute the performance evaluation program according to this aspect, similar to the performance evaluating method according to the third aspect, the computer acquires a plurality of types of static operation determination data including the exhaust gas temperature difference Td and the cavity temperature Tr as static operation determination data and determines the gas turbine 1 to be in the static operation state under the condition that all the plurality of types of static operation determination data are determined to be stationary. Thus, also in this aspect, an evaluation index value that is appropriate for a performance evaluation can be acquired.

(15) In a performance evaluation program of a gas turbine according to a 15th aspect, in the performance evaluation program of a gas turbine according to the 14th aspect, the determining of whether or not each of the plurality of types of static operation determination data is stationary (S21) includes a short-term static operation determining process (S22, S50) and a long-term static operation determining process (S25) performed for each of the plurality of types of static operation determination data. In the short-term static operation determining process (S22, S50), a data determining process (S23, S53) of extracting the static operation determination data of each of a plurality of times in a first period T1 in the past set in advance from a determination time among the static operation determination data for each of the plurality of times stored in the storing of data (S15) and determining whether or not the extracted static operation determination data of each of the plurality of times enters a range of a variation width set in advance for the static operation determination data is performed, and it is determined whether or not the static operation determination data is stationary in the first period T1 in accordance with a result of the data determining process (S23, S53). In the long-term static operation determining process (S25), a data determining process (S26) of extracting the static operation determination data of each of a plurality of times in a second period T2, which is longer than the first period T1, in the past set in advance from a determination time from the static operation determination data for each of the plurality of times stored in the storing of data (S15) and determining whether or not the extracted static operation determination data of each of the plurality of times enters a range of a variation width set in advance for the static operation determination data is performed, and it is determined whether or not the static operation determination data is stationary in the second period T2 in accordance with a result of the data determining process (S26). In the determining of the gas turbine to be in the static operation state (S29), the gas turbine 1 is determined to be in the static operation state under the condition that any one of the plurality of types of static operation determination data is determined to be stationary in the first period T1 and the second period T2.

By causing a computer to execute the performance evaluation program according to this aspect, similar to the performance evaluating method according to the fourth aspect, for each of the plurality of types of static operation determination data, the computer determines whether or not the static operation determination data is stationary and determines whether or not the static operation determination data is stationary during two periods that are periods different from each other. For this reason, also in this aspect, determination of whether or not the gas turbine 1 is in the static operation state can be performed with high accuracy, and as a result, an evaluation index value that is appropriate for evaluating the performance can be acquired.

(16) In a performance evaluation program of a gas turbine according to a 16th aspect, in the performance evaluation program of a gas turbine according to the 14th aspect or the 15th aspect, in the acquiring of static operation determination data and acquiring of index value data (S10), at least one of an output PW of the gas turbine 1 and a temperature Ti of air sucked in by the compressor 10 is additionally acquired as the plurality of types of static operation determination data.

By causing a computer to execute the performance evaluation program according to this aspect, similar to the performance evaluating method according to the fifth aspect, the computer, in addition to the exhaust gas temperature difference Td and the cavity temperature Tr, acquires at least one of the output PW of the gas turbine 1 and the temperature Ti of air sucked in by the compressor 10. For this reason, also in this aspect, determination of whether or not the gas turbine 1 is in the static operation state can be performed with high accuracy, and as a result, an evaluation index value that is appropriate for evaluating the performance can be acquired.

(17) In a performance evaluation program of a gas turbine according to a 17th aspect, in the performance evaluation program of a gas turbine according to any one of the 12th aspect to the 16th aspect, the determining of whether or not the gas turbine is in the static operation state (S23, S26) includes smoothing the static operation determination data for each of the plurality of times during a period (S24a, S27a) and determining that the static operation determination data of each of the plurality of times during the period enters the range of the variation width for the static operation determination data (S24b, S27b) in a case in which an absolute value of a difference between the static operation determination data smoothed in the smoothing of the static operation determination data and the static operation determination data of the determination time (S24a, S27a) is less than a value set in advance.

By causing a computer to execute the performance evaluation program according to this aspect, similar to the performance evaluating method according to the seventh aspect, the computer can determine whether or not static operation determination data is stationary within the first period T1 with the third period T3 shorter than the first period T1 taken into account.

(18) In a performance evaluation program of a gas turbine according to an 18th aspect, in the performance evaluation program of a gas turbine according to the 17th aspect, in the smoothing process described above (S24a, S27a), an exponential moving average value of a plurality of pieces of target data is acquired, and the exponential moving average value is set as data acquired by smoothing the plurality of pieces of target data.

By causing a computer to execute the performance evaluation program according to this aspect, similar to the performance evaluating method according to the eighth aspect, by using the exponential moving average value as data acquired by smoothing a plurality of pieces of target data, determination on whether or not the static operation determination data is stationary can be performed with high accuracy.

The performance evaluating device 100 for the gas turbine 1 according to the embodiments and the modified examples described above, for example, can be perceived as below.

(19) A performance evaluation device for a gas turbine according to a 19th aspect is applied to the following gas turbine.

This gas turbine 1 includes a compressor 10 configured to be able to generate compressed air Acom by compressing air A, a combustor 20 configured to be able to generate a combustion gas G by combusting a fuel F in the compressed air Acom, and a turbine 30 configured to be able to be driven using the combustion gas G. The turbine 30 described above includes a rotor 31 configured to be able to rotate around an axis line Ar as its center, a turbine casing 35 covering an outer circumference of the rotor 31, a plurality of turbine vane rows 36 disposed on an inner circumferential side of the turbine casing 35, and an exhaust duct 7 through which an exhaust gas EG that is a combustion gas G discharged from the turbine casing 35 is able to circulate. The plurality of turbine vane rows 36 are aligned with gaps interposed therebetween in an axis line direction Da in which the axis line Ar extends. Each of the plurality of turbine vane rows 36 described above includes a plurality of turbine vanes 37 aligned in a circumferential direction Dc with respect to the axis line Ar. The turbine vane 37 described above includes a vane body 37a, of which a cross-sectional shape perpendicular to a diameter direction Dr with respect to the axis line Ar forms a vane shape, extending in the diameter direction Dr, an inner shroud 37c disposed on a diameter direction inner side Dri of the vane body 37a, and an outer shroud 37b disposed on a diameter direction outer side Dro of the vane body 37a. The rotor 31 described above includes a rotor shaft 32 extending in the axis line direction Da with the axis line Ar as its center and a plurality of turbine blade rows 33 attached to the rotor shaft 32. Each of the plurality of turbine blade rows 33 described above is disposed on an axis line downstream side Dad out of an axis line upstream side Dau and the axis line downstream side Dad in the axis line direction Da with respect to any one turbine vane row 36 among the plurality of turbine vane rows 36. Each of the plurality of turbine blade rows 33 described above includes a plurality of turbine blades 34 aligned in the circumferential direction Dc.

The performance evaluating device for the gas turbine 1 includes: a data acquiring unit 110 configured to acquire at least one piece of static operation determination data for determining whether or not the gas turbine 1 is static operation state and be able to acquire index value data for acquiring an evaluation index value used for a performance evaluation of the gas turbine 1; a data storing unit 115 configured to store the data acquired by the data acquiring unit 110 in a time series; a static operation determining unit 120 configured to include a data determining unit 123, 126, 153 extracting the static operation determination data for each of a plurality of times in a period in the past set in advance from a determination time from among the static operation determination data for the plurality of times stored by the data storing unit 115 and determining whether or not the extracted static operation determination data for each of the plurality of times enters a range of a variation width set in advance and determine whether or not the gas turbine 1 is in a static operation state in accordance with a determination result acquired by the data determining unit 123, 126, 153; and an evaluation index value calculating unit 130 configured to acquire the evaluation index value using the index value data of the determination time at which the gas turbine 1 is determined to be in the static operation state by the static operation determining unit 120. At least one piece of the static operation determination data described above is an exhaust gas temperature difference Td that is a difference between a first exhaust gas temperature Te1 that is a temperature of an exhaust gas EG that has passed through a turbine blade row of a final stage that is a turbine blade row 33 of the axis line furthest downstream side Dad among the plurality of turbine blade rows 33 and a second exhaust gas temperature Te2 that is the temperature of the exhaust gas EG at a position further away from the turbine blade row of the final stage than a position at which the first exhaust gas temperature Te1 is measured or a cavity temperature Tr between the inner shroud 37c of the turbine vane 37 and the rotor shaft 32.

In this aspect, similar to the performance evaluating method according to the first aspect, a cavity temperature Tr or an exhaust gas temperature difference Td is acquired as one type of static operation determination data, and under the condition that this exhaust gas temperature difference Td is determined to be stationary, by using the evaluation value data of this determination time, a turbine efficiency ηt that is one type of evaluation index value is acquired. Thus, also in this aspect, an evaluation index value that is appropriate for a performance evaluation can be acquired.

(20) In a performance evaluation device for a gas turbine according to a 20th aspect, in the performance evaluation device for a gas turbine according to the 19th aspect, the static operation determining unit 120 includes: a short-term static operation determining unit 122, 150 configured to include a data determining unit 123, 153 extracting the static operation determination data for each of a plurality of times in a first period T1 in the past set in advance from a determination time among the static operation determination data for a plurality of times stored in the data storing unit 115 and determines whether or not the extracted static operation determination data for each of the plurality of times enters a range of a variation width set in advance and determines whether or not the static operation determination data is stationary in the first period T1 in accordance with a determination result acquired by the data determining unit 123, 153; a long-term static operation determining unit 125 configured to include a data determining unit 126 extracting the static operation determination data for each of a plurality of times in a second period T2, which is longer than the first period T1, in the past set in advance from a determination time among the static operation determination data for a plurality of times stored in the data storing unit 115 and determining whether or not the extracted static operation determination data for each of the plurality of times enters a range of a variation width set in advance and determine whether or not the static operation determination data is stationary in the second period T2 in accordance with a determination result acquired by the data determining unit 126; and a turbine static operation determining unit 129 configured to determine that the gas turbine 1 is in the static operation state under the condition that the static operation determination data is determined to be stationary in the first period T1 and the second period T2.

In this aspect, similar to the performance evaluating method according to the second aspect, under the condition that the static operation determination data is determined to be stationary in the first period T1 and the second period T2, the gas turbine 1 is determined to be in the static operation state. Thus, also in this aspect, an evaluation index value that is appropriate for a performance evaluation can be acquired.

(21) In a performance evaluation device for a gas turbine according to a 21th aspect, in the performance evaluation device for a gas turbine according to the 19th aspect, the data acquiring unit 110 is able to acquire a plurality of types of static operation determination data including the exhaust gas temperature difference td and the cavity temperature Tr as the at least one piece of the static operation determination data. The static operation determining unit 120 described above includes: a data type determining unit 121 that includes a data determining unit 123, 126, 153 determining whether or not each of the plurality of types of static operation determination data enters a range of a variation width set in advance for each of the plurality of types of static operation determination data and determines whether or not each of the plurality of types of static operation determination data is stationary in accordance with a determination result acquired by the data determining unit 123, 126, 153; and a turbine static operation determining unit 129 that determines that the gas turbine 1 is in the static operation state under the condition that the exhaust gas temperature difference Td and the cavity temperature Tr are determined to be stationary by the data type determining unit 121.

In this aspect, similar to the performance evaluating method according to the third aspect, a plurality of types of static operation determination data including the exhaust gas temperature difference Td and the cavity temperature Tr are acquired as static operation determination data, and the gas turbine 1 is determined to be in the static operation state under the condition that the exhaust gas temperature difference Td and the cavity temperature Tr are determined to be stationary. Thus, also in this aspect, an evaluation index value that is appropriate for a performance evaluation can be acquired.

(22) In a performance evaluation device for a gas turbine according to a 22nd aspect, in the performance evaluation device for a gas turbine according to the 21th aspect, the data type determining unit 121 includes a short-term static operation determining unit 122, 150 and a long-term static operation determining unit 125 performing determination each of the plurality of types of static operation determination data. The short-term static operation determining unit 122, 150 includes a data determining unit 123, 153 extracting the static operation determination data of each of a plurality of times in a first period T1 in the past set in advance from a determination time among the static operation determination data for each of the plurality of times stored by the data storing unit 115 and determines whether or not the extracted static operation determination data of each of the plurality of times enters a range of a variation width set in advance for the static operation determination data and determines whether or not the static operation determination data is stationary in the first period T1 in accordance with a determination result acquired by the data determining unit 123, 153. The long-term static operation determining unit 125 includes a data determining unit 126 extracting the static operation determination data of each of a plurality of times in a second period T2, which is longer than the first period T1, in the past set in advance from a determination time among the static operation determination data for each of the plurality of times stored by the data storing unit 115 and determining whether or not the extracted static operation determination data of each of the plurality of times enters a range of a variation width set in advance for the static operation determination data and determines whether or not the static operation determination data is stationary in the second period T2 in accordance with a determination result acquired by the data determining unit 126. The turbine static operation determining unit 129 determines that the gas turbine 1 is in the static operation state under the condition that any one of the plurality of types of static operation determination data is determined to be stationary in the first period T1 and the second period T2.

In this aspect, similar to the performance evaluating method according to the fourth aspect, for each of a plurality of types of static operation determination data, it is determined whether or not the static operation determination data is stationary, and, it is determined whether or not the static operation determination data is stationary during two periods different from each other. For this reason, also in this aspect, determination of whether or not the gas turbine 1 is in the static operation state can be performed with high accuracy, and as a result, an evaluation index value that is appropriate for evaluating the performance can be acquired.

(23) In a performance evaluation device for a gas turbine according to a 23rd aspect, in the performance evaluation device for a gas turbine according to any one of the 19th aspect to the 22nd aspect, the data determining unit 123, 126 includes: a smoothing unit 124a, 127a smoothing the static operation determination data for each of the plurality of times during a period; and a determination unit 124b, 127b determining that the static operation determination data of each of the plurality of times during the period enters the range of the variation width for the static operation determination data in a case in which an absolute value of a difference between the static operation determination data smoothed by the smoothing unit 124a, 127a and the static operation determination data of the determination time is less than a value set in advance.

(24) In a performance evaluation device for a gas turbine according to a 24th aspect, in the performance evaluation device for a gas turbine according to the 23rd aspect, the smoothing unit 124a, 127a acquires an exponential moving average value of a plurality of pieces of target data and sets the exponential moving average value as data acquired by smoothing the plurality of pieces of target data.

In this aspect, similar to the performance evaluating method according to the eighth aspect, by using the exponential moving average value as data acquired by smoothing a plurality of pieces of target data, determination on whether or not the static operation determination data is stationary can be performed with high accuracy.

EXPLANATION OF REFERENCES

1 Gas turbine
2 Gas turbine rotor
5 Gas turbine casing
6 Middle casing
7 Exhaust duct
8 Fuel line
8v Fuel valve
9 Power generator
10 Compressor
11 Compressor rotor
12 Rotor shaft
13 Turbine blade row
14 IGV
15 Compressor casing
16 Turbine vane row
20 Combustor
21 Burner
22 Transition piece (or a combustor liner)
30 Turbine
31 Turbine rotor
32 Rotor shaft
33 Turbine blade row
34 Turbine blade
34a Blade body
34c Platform
35 Turbine casing
36 Turbine vane row
37 Turbine vane
37a Vane body
37b Outer shroud
37c Inner shroud
37d Seal retaining part
37e Seal
39 Combustion gas flow passage
40 Rotation number counter
41 Output meter
42 Intake air temperature indicator
43 Intake air pressure gauge
44 Discharge air temperature indicator
45 Discharge pressure gauge
46 Fuel flow rate meter
47 First exhaust gas temperature indicator
48 Second exhaust gas temperature indicator
49 Cavity temperature indicator
50 Control device
100 Performance evaluating device
101 Computer main body
102 CPU
103 Main storage device
104 Auxiliary storage device
104a Inherent data
104b Performance evaluation program
105 Storage and reproduction device
106 Input/output interface
107 Facility interface
108 Communication interface
109a Input device
109b Display device
110 Data acquiring unit
111 Data receiving unit
112 Calculation unit
115 Data storing unit
120 Static operation determining unit
121 Data type determining unit
122 Short-term static operation determining unit
123 Data determining unit
124a Smoothing unit of first period
124b Determination unit of first period
125 Long-term static operation determining unit
126 Data determining unit
127a Smoothing unit of second period
127b Determination unit of second period
128 Determination completion determining unit
129 Turbine static operation determining unit
130 Evaluation index value calculating unit
140 Output unit
150 Short-term static operation determining unit
151 Determination pre-processing unit
152a Smoothing unit of third period
152b Difference calculating unit
153 First period data determining unit
154a Smoothing unit of first period
154b Determination unit of first period

What is claimed is:

1. A method of evaluating performance of a gas turbine including:
a compressor configured to be able to generate compressed air by compressing air, a combustor configured to be able to generate a combustion gas by combusting a fuel in the compressed air, and a turbine configured to be able to be driven using the combustion gas,
wherein the turbine includes a rotor configured to be able to rotate around an axis line as its center, a turbine casing covering an outer circumference of the rotor, a plurality of turbine vane rows disposed on an inner circumferential side of the turbine casing, and an exhaust duct through which an exhaust gas that is a combustion gas discharged from the turbine casing is able to circulate,
wherein the plurality of turbine vane rows are aligned with gaps interposed therebetween in an axis line direction in which the axis line extends,
wherein each of the plurality of turbine vane rows includes a plurality of turbine vanes aligned in a circumferential direction with respect to the axis line,
wherein the turbine vane includes a vane body, of which a cross-sectional shape perpendicular to a diameter direction with respect to the axis line forms a vane shape, extending in the diameter direction, an inner shroud disposed on a diameter direction inner side of the vane body, and an outer shroud disposed on a diameter direction outer side of the vane body, wherein the rotor includes a rotor shaft extending in the axis line direction with the axis line as its center and a plurality of turbine blade rows attached to the rotor shaft, wherein each of the plurality of turbine blade rows is disposed on an axis line downstream side out of an axis line upstream side and the axis line downstream side in the axis line direction with respect to any one turbine vane row among the plurality of turbine vane rows, and wherein each of the plurality of turbine blade rows includes a plurality of turbine blades aligned in the circumferential direction, the method comprising:

acquiring at least one piece of static operation determination data for determining whether or not the gas turbine is in a static operation state and acquiring index value data for acquiring an evaluation index value used for a performance evaluation of the gas turbine;

storing the data acquired in the acquiring of static operation determination data and acquiring of index value data in a time series;

performing a data determining process of extracting the static operation determination data of each of a plurality of times in a period is in a past set in advance from a determination time from the static operation determination data for each of the plurality of times stored in the storing of the data and determining whether or not the extracted static operation determination data of each of the plurality of times enters a range, set in advance, and determining whether or not the gas turbine is in the static operation state in accordance with a result of the data determining process; and acquiring the evaluation index value using the index value data at the determination time at which the gas turbine is determined to be in the static operation state in the determining of whether or not the gas turbine is in the static operation state, wherein at least one piece of the static operation determination data is 1) an exhaust gas temperature difference that is a difference between a first exhaust gas temperature that is a temperature of an exhaust gas that has passed through a turbine blade row of a final stage that is a turbine blade row of the axis line furthest downstream side among the plurality of turbine blade rows and a second exhaust gas temperature that is the temperature of the exhaust gas at a position further away from the turbine blade row of the final stage than a position at which the first exhaust gas temperature is measured or 2) a cavity temperature between the inner shroud of the turbine vane and the rotor shaft.

2. The method of evaluating performance of the gas turbine according to claim 1, wherein the determining of whether or not the gas turbine is in the static operation state includes:

performing a data determining process of extracting the static operation determination data of each of a plurality of times in a first period in the past set in advance from a determination time from the static operation determination data for each of the plurality of times stored in the storing of the data and determining whether or not the extracted static operation determination data of each of the plurality of times enters a range of a variation width the range, set in advance, and determining whether or not the static operation determination data is stationary in the first period in accordance with a result of the data determining process;

performing a data determining process of extracting the static operation determination data of each of a plurality of times in a second period, which is longer than the first period, in the past set in advance from a determination time from the static operation determination data for each of the plurality of times stored in the storing of the data and determining whether or not the extracted static operation determination data of each of the plurality of times enters the range, set in advance, and determining whether or not the static operation determination data is stationary in the second period in accordance with a result of the data determining process; and determining that the gas turbine is in the static operation state under the condition that the static operation determination data is determined to be stationary in the first period and the second period.

3. The method of evaluating performance of the gas turbine according to claim 1, wherein, in the acquiring of static operation determination data and acquiring of index value data, a plurality of types of static operation determination data including the exhaust gas temperature difference and the cavity temperature are acquired as the at least one piece of the static operation determination data, and wherein the determining of whether or not the gas turbine is in the static operation state includes:

performing a data determining process of determining whether or not each of the plurality of types of static operation determination data enters the range, set in advance, for each of the plurality of types of static operation determination data and determining whether or not each of the plurality of types of static operation determination data is stationary in accordance with a result of the data determining process; and determining that the gas turbine is in the static operation state under the condition that the exhaust gas temperature difference and the cavity temperature are determined to be stationary in the determining of whether or not each of the plurality of types of static operation determination data is stationary.

4. The method of evaluating performance of the gas turbine according to claim 3, wherein the determining of whether or not each of the plurality of types of static operation determination data is stationary includes a short-term static operation determining process and a long-term static operation determining process performed for each of the plurality of types of static operation determination data, wherein, in the short-term static operation determining process, a data determining process of extracting the static operation determination data of each of a plurality of times in a first period in the past set in advance from a determination time from the static operation determination data for each of the plurality of times stored in the storing of the data and determining whether or not the extracted static operation determination data of each of the plurality of times enters the range, set in advance, for the static operation determination data is performed, and it is determined whether or not the static operation determination data is stationary in the first period in accordance with a result of the data determining process, and wherein, in the long-term static operation determining process, a data determining process of extracting the static operation determination data of each of a plurality of times in a second period, which is longer than the first period, in the past set in advance from a determination time from the static operation determination data for each of the plurality of times stored in the storing of the data and determining whether or not the extracted static operation determination data of each of the plurality of times enters the range, set in advance, for the static operation determination data is performed, and it is determined whether or not the static operation determination data is stationary in the second period in accordance with a result of the data determining process, wherein, in the determining of the gas turbine to be in the static operation state, the gas turbine is determined to be in the static operation state under the condition that any one of the plurality of types of static operation determination data is determined to be stationary in the first period and the second period.

5. The method of evaluating performance of the gas turbine according to claim 3, wherein, in the acquiring of static operation determination data and acquiring of index value data, at least one of an output of the gas turbine and a temperature of air sucked in by the compressor is additionally acquired as the plurality of types of static operation determination data.

6. The method of evaluating performance of the gas turbine according to claim 1, wherein the determining of whether or not the gas turbine is in the static operation state includes smoothing the static operation determination data for each of the plurality of times during a period and determining that the static operation determination data of each of the plurality of times during the period enters the range of the variation width for the static operation determination data in a case in which an absolute value of a difference between the static operation determination data smoothed in the smoothing of the static operation determination data and the static operation determination data of the determination time is less than a value set in advance.

7. The method of evaluating performance of the gas turbine according to claim 2, wherein the short-term static operation determining process includes a determination pre-processing process and a first period determination process, wherein the determination pre-processing process includes a smoothing process of extracting the static operation determination data of each of a plurality of times in a third period, which is shorter than the first period, that is a period in the past from determination pre-processing among the static operation determination data of each of a plurality of times stored in the storing of the data and smoothing the extracted static operation determination data of each of the plurality of times and a difference calculating process of acquiring an absolute value of a difference between latest static operation determination data among the static operation determination data of each of the plurality of times and the static operation determination data smoothed in the smoothing process, wherein the determination pre-processing process is performed a plurality of number of times in the first period in the past from the determination time, and wherein the first period determination process includes a smoothing process of smoothing an absolute value of each difference acquired in the plurality of number of times of the determination pre-processing process performed in the first period and a determination process of determining that the static operation determination data is stationary in a case in which the absolute value of the difference smoothed in the smoothing process is less than a value set in advance.

8. The method of evaluating performance of the gas turbine according to claim 6, wherein, in the smoothing process, an exponential moving average value of a plurality of pieces of target data is acquired, and the exponential moving average value is set as data acquired by smoothing the plurality of pieces of target data.

9. The method of evaluating performance of the gas turbine according to claim 1, wherein, in the acquiring of static operation determination data and acquiring of index value data, as the index value data, an intake air temperature that is a temperature of intake air sucked in by the compressor, an intake air pressure that is a pressure of the intake air, a discharge air temperature that is a temperature of a compressed air discharged by the compressor, a discharge pressure that is a pressure of the compressed air, a fuel flow rate flowing into the combustor, the second exhaust gas temperature, and an output of the gas turbine are acquired, and wherein, in the acquiring of the evaluation index value, a turbine entrance temperature that is a temperature of the combustion gas at an entrance of the turbine into which the combustion gas from the combustor flows is acquired by using the intake air temperature, the intake air pressure, the discharge air temperature, the discharge pressure, the fuel flow rate, the second exhaust gas temperature and the output of the gas turbine at the determination time at which the gas turbine is determined to be in the static operation state in the determining of whether or not the gas turbine is in the static operation state.

10. The method of evaluating performance of the gas turbine according to claim 1, wherein, in the acquiring of static operation determination data and acquiring of index value data, as the index value data, an intake air temperature that is a temperature of intake air sucked in by the compressor, an intake air pressure that is a pressure of the intake air, a discharge air temperature that is a temperature of a compressed air discharged by the compressor, a discharge pressure that is a pressure of the compressed air, a fuel flow rate flowing into the combustor, the second exhaust gas temperature, and an output of the gas turbine are acquired, and wherein, in the acquiring of the evaluation index value, an efficiency of the turbine is acquired using the intake air temperature, the intake air pressure, the discharge air temperature, the discharge pressure, the fuel flow rate, the second exhaust gas temperature and the output of the gas turbine at the determination time at which the gas turbine is determined to be in the static operation state in the determining of whether or not the gas turbine is in the static operation state.

11. The method of evaluating performance of the gas turbine according to claim 1, wherein, in the acquiring of static operation determination data and acquiring of index value data, as the index value data, an intake air temperature that is a temperature of intake air sucked in by the compressor, an intake air pressure that is a pressure of the intake air, a discharge air temperature that is a temperature of a compressed air discharged by the compressor, and a discharge pressure that is a pressure of the compressed air are acquired, and wherein, in the acquiring of the evaluation index value, efficiency of the compressor that is one type of evaluation index value is acquired using the intake air temperature, the intake air pressure, the discharge air temperature, and the discharge pressure at the determination time at which the gas turbine is determined to be in the static operation state in the determining of whether or not the gas turbine is in the static operation state.

12. A performance evaluating device for a gas turbine including a compressor configured to be able to generate compressed air by compressing air, a combustor configured to be able to generate a combustion gas by combusting a fuel in the compressed air, and a turbine configured to be able to be driven using the combustion gas, wherein the turbine includes a rotor configured to be able to rotate around an axis line as its center, a turbine casing covering an outer circumference of the rotor, a plurality of turbine vane rows disposed on an inner circumferential side of the turbine casing, and an exhaust duct through which an exhaust gas that is a combustion gas discharged from the turbine casing is able to circulate, wherein the plurality of turbine vane rows are aligned with gaps interposed therebetween in an axis line direction in which the axis line extends, wherein each of the plurality of turbine vane rows includes a plurality of turbine vanes aligned in a circumferential direction with respect to the axis line, wherein the turbine vane includes a vane body, of which a cross-sectional shape perpendicular to a diameter direction with respect to the axis line forms a vane shape, extending in the diameter direction, an inner shroud disposed on a diameter direction inner side of the vane body, and an outer shroud disposed on a diameter direction outer side of the vane body, wherein the rotor includes a rotor shaft extending in the axis line direction with the axis line as its center and a plurality of turbine blade rows attached to the rotor shaft, wherein each of the plurality of turbine blade rows is disposed on an axis line downstream side out of an axis line upstream side and the axis line downstream side in the axis line direction with respect to any one turbine vane row among the plurality of turbine vane rows, and wherein each of the plurality of turbine blade rows includes a plurality of turbine blades aligned in the circumferential direction, the performance evaluating device for the gas turbine comprising:

a data acquiring unit configured to acquire at least one piece of static operation determination data for determining whether or not the gas turbine is in a static operation state and be able to acquire index value data for acquiring an evaluation index value used for a performance evaluation of the gas turbine;

a data storing unit configured to store the data acquired by the data acquiring unit in a time series;

a static operation determining unit configured to include a data determining unit extracting the static operation determination data for each of a plurality of times in a period is in a past set in advance from a determination time from among the static operation determination data for the plurality of times stored by the data storing unit and determining whether or not the extracted static operation determination data for each of the plurality of times enters a range, set in advance, and determine whether or not the gas turbine is in the static operation state in accordance with a determination result acquired by the data determining unit; and an evaluation index value calculating unit configured to acquire the evaluation index value using the index value data at the determination time at which the gas turbine is determined to be in the static operation state by the static operation determining unit, wherein at least one piece of the static operation determination data is 1) an exhaust gas temperature difference that is a difference between a first exhaust gas temperature that is a temperature of an exhaust gas that has passed through a turbine blade row of a final stage that is a turbine blade row of the axis line furthest downstream side among the plurality of turbine blade rows and a second exhaust gas temperature that is the temperature of the exhaust gas at a position further away from the turbine blade row of the final stage than a position at which the first exhaust gas temperature is measured or 2) a cavity temperature between the inner shroud of the turbine vane and the rotor shaft.

13. The performance evaluating device for the gas turbine according to claim 12, wherein the static operation determining unit includes:

a short-term static operation determining unit configured to include a data determining unit extracting the static operation determination data for each of a plurality of times in a first period in the past set in advance from a determination time among the static operation determination data for a plurality of times stored in the data storing unit and determine whether or not the extracted static operation determination data for each of the plurality of times enters the range, set in advance, and determine whether or not the static operation determination data is stationary in the first period in accordance with a determination result acquired by the data determining unit;

a long-term static operation determining unit configured to include a data determining unit extracting the static operation determination data for each of a plurality of times in a second period, which is longer than the first period, in the past set in advance from a determination time among the static operation determination data for a plurality of times stored in the data storing unit and determining whether or not the extracted static operation determination data for each of the plurality of times enters the range, set in advance, and determine whether or not the static operation determination data is stationary in the second period in accordance with a determination result acquired by the data determining unit; and a turbine static operation determining unit configured to determine that the gas turbine is in the static operation state under the condition that the static operation determination data is determined to be stationary in the first period and the second period.

14. The performance evaluating device for the gas turbine according to claim 12, wherein the data acquiring unit is able to acquire a plurality of types of static operation determination data including the exhaust gas temperature difference and the cavity temperature as the at least one piece of the static operation determination data, and wherein the static operation determining unit includes:

a data type determining unit that includes a data determining unit determining whether or not each of the plurality of types of static operation determination data enters the range, set in advance, for each of the plurality of types of static operation determination data and determines whether or not each of the plurality of types of static operation determination data is stationary in accordance with a determination result acquired by the data determining unit; and a turbine static operation determining unit that determines that the gas turbine is in the static operation state under the condition that the exhaust gas temperature difference and the cavity temperature are determined to be stationary by the data type determining unit.

15. The performance evaluating device for the gas turbine according to claim 14, wherein the data type determining unit includes a short-term static operation determining unit and a long-term static operation determining unit performing determination each of the plurality of types of static operation determination data, wherein the short-term static operation determining unit includes a data determining unit extracting the static operation determination data of each of a plurality of times in a first period in the past set in advance from a determination time among the static operation determination data for each of the plurality of times stored by the data storing unit and determines whether or not the extracted static operation determination data of each of the plurality of times enters the range, set in advance, for the static operation determination data and determines whether or not the static operation determination data is stationary in the first period in accordance with a determination result acquired by the data determining unit, wherein the long-term static operation determining unit includes a data determining unit extracting the static operation determination data of each of a plurality of times in a second period, which is longer than the first period, in the past set in advance from a determination time among the static operation determination data for each of the plurality of times stored by the data storing unit and determining whether or not the extracted static operation determination data of each of the plurality of times enters the range, set in advance, for the static operation determination data and determines whether or not the static operation determination data is stationary in the second period in accordance with a determination result acquired by the data determining unit; and wherein the turbine static operation determining unit determines that the gas turbine is in the static operation state under the condition that any one of the plurality of types of static operation determination data is determined to be stationary in the first period and the second period.

16. The performance evaluating device for the gas turbine according to claim 12, wherein the data determining unit includes: a smoothing unit smoothing the static operation determination data for each of the plurality of times during a period; and a determination unit determining that the static operation determination data of each of the plurality of times during the period enters the range of the variation width for the static operation determination data in a case in which an absolute value of a difference between the static operation determination data smoothed by the smoothing unit and the static operation determination data of the determination time is less than a value set in advance.

17. The performance evaluating device for the gas turbine according to claim 16, wherein the smoothing unit acquires an exponential moving average value of a plurality of pieces of target data and sets the exponential moving average value as data acquired by smoothing the plurality of pieces of target data.

* * * * *